US012686731B2

(12) United States Patent
Baillie et al.

(10) Patent No.: US 12,686,731 B2
(45) **Date of Patent: *Jul. 21, 2026**

(54) CATALYST SYSTEMS AND PROCESSES FOR PRODUCING POLYETHYLENE USING THE SAME

(71) Applicant: Dow Global Technologies LLC, Midland, MI (US)

(72) Inventors: Rhett A. Baillie, Lake Jackson, TX (US); Hien Q. Do, Lake Jackson, TX (US); Andrew M. Camelio, Midland, MI (US); Johnathan E. Delorbe, Lake Jackson, TX (US); Mari S. Rosen, Lake Jackson, TX (US); Philip P. Fontaine, Lake Jackson, TX (US); David M. Pearson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 706 days.

This patent is subject to a terminal disclaimer.

(21) Appl. No.: 18/000,036

(22) PCT Filed: May 28, 2021

(86) PCT No.: PCT/US2021/034866

§ 371 (c)(1),
(2) Date: Nov. 28, 2022

(87) PCT Pub. No.: WO2021/243213

PCT Pub. Date: Dec. 2, 2021

(65) Prior Publication Data

US 2023/0322968 A1 Oct. 12, 2023

Related U.S. Application Data

(60) Provisional application No. 63/031,638, filed on May 29, 2020, provisional application No. 63/143,333, filed on Jan. 29, 2021.

(51) Int. Cl.

*C08F 10/02* (2006.01)
*C08F 2/01* (2006.01)
*C08F 2/34* (2006.01)
*C08F 4/02* (2006.01)
*C08F 4/64* (2006.01)
*C08F 4/659* (2006.01)
*C08F 210/16* (2006.01)

(52) U.S. Cl.

CPC ................ *C08F 10/02* (2013.01); *C08F 2/01* (2013.01); *C08F 2/34* (2013.01); *C08F 4/02* (2013.01); *C08F 4/64193* (2013.01); *C08F 4/65912* (2013.01); *C08F 4/65916* (2013.01); *C08F 210/16* (2013.01)

(58) Field of Classification Search

None

See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,543,399 | A | 9/1985 | Jenkins, III et al. |
| 4,665,208 | A | 5/1987 | Welborn, Jr. et al. |
| 4,874,734 | A | 10/1989 | Kioka et al. |
| 4,882,400 | A | 11/1989 | Pumain et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 5,041,584 | A | 8/1991 | Crapo et al. |
| 5,091,352 | A | 2/1992 | Kioka et al. |
| 5,103,031 | A | 4/1992 | Smith, Jr. |
| 5,157,137 | A | 10/1992 | Sangokoya |
| 5,204,419 | A | 4/1993 | Tsutsui et al. |
| 5,206,199 | A | 4/1993 | Kioka et al. |
| 5,235,081 | A | 8/1993 | Sangokoya |
| 5,248,801 | A | 9/1993 | Sangokoya |
| 5,329,032 | A | 7/1994 | Tran et al. |
| 5,352,749 | A | 10/1994 | DeChellis et al. |
| 5,541,270 | A | 7/1996 | Chinh et al. |
| 5,665,818 | A | 9/1997 | Tilston et al. |
| 5,677,375 | A | 10/1997 | Rifi et al. |
| 5,965,477 | A | 10/1999 | Sivaram et al. |
| 5,972,510 | A | 10/1999 | O'Hare et al. |
| 6,034,187 | A | 3/2000 | Maehama et al. |

(Continued)

FOREIGN PATENT DOCUMENTS

| | | | |
|---|---|---|---|
| CN | 109476783 | A | 3/2019 |
| CN | 110461890 | A | 11/2019 |

(Continued)

OTHER PUBLICATIONS

Chinese Office Action dated Jan. 13, 2025, pertaining to CN Patent Application No. 202180037924.7, 20 pgs.
US Notice of Allowance dated Jun. 10, 2025, pertaining to U.S. Appl. No. 18/000,038, 10 pgs.
Japanese Notice of Refusal dated Jul. 1, 2025, pertaining to JP Patent Application No. 2022-567508, 12 pgs.
Japanese Notice of Refusal dated Jul. 1, 2025, pertaining to JP Patent Application No. 2022-567500, 5 pgs.
US Non-Final Office Action dated Jul. 9, 2025, pertaining to U.S. Appl. No. 17/999,783, 11 pgs.

(Continued)

*Primary Examiner* — Fred M Teskin

(74) *Attorney, Agent, or Firm* — Dinsmore & Shohl LLP

(57) ABSTRACT

Embodiments of the present application are directed to procatalysts, and catalyst systems including procatalysts including a metal-ligand complex having the structure of formula (1): [Formula I].

20 Claims, No Drawings

(56) References Cited

U.S. PATENT DOCUMENTS

| | | | |
|---|---|---|---|
| 6,472,484 B1 | 10/2002 | Abe et al. | |
| 6,753,390 B2 | 6/2004 | Ehrman et al. | |
| 9,029,487 B2 | 5/2015 | Klosin et al. | |
| 9,234,060 B2 | 1/2016 | Kao et al. | |
| 9,527,941 B2 | 12/2016 | Demirors et al. | |
| 10,301,412 B2 * | 5/2019 | Klosin | C07F 7/00 |
| 2008/0071046 A1 | 3/2008 | Leclerc et al. | |
| 2015/0166699 A1 | 6/2015 | Kao et al. | |
| 2016/0340454 A1 | 11/2016 | Funk et al. | |
| 2017/0008444 A1 | 1/2017 | Bopp et al. | |
| 2020/0247917 A1 | 8/2020 | Do et al. | |
| 2021/0070902 A1 | 3/2021 | Liu et al. | |
| 2021/0261703 A1 | 8/2021 | Liu et al. | |
| 2021/0380737 A1 | 12/2021 | Mure et al. | |
| 2023/0250202 A1 * | 8/2023 | Baillie | C08F 10/02 526/129 |
| 2023/0287159 A1 | 9/2023 | Baillie et al. | |
| 2025/0034292 A1 * | 1/2025 | Camelio | C08F 210/16 |

FOREIGN PATENT DOCUMENTS

| | | | |
|---|---|---|---|
| CN | 110691797 | A | 1/2020 |
| EP | 0279586 | B1 | 5/1994 |
| EP | 0517868 | B1 | 11/1995 |
| EP | 0516476 | B1 | 10/1997 |
| EP | 0511665 | B1 | 7/1998 |
| EP | 0594218 | B1 | 3/1999 |
| EP | 0767184 | B1 | 8/1999 |
| EP | 0561476 | B1 | 9/1999 |
| EP | 0802202 | B1 | 10/1999 |
| EP | 0794200 | B1 | 7/2000 |
| EP | 1323746 | B1 | 2/2009 |
| WO | 1994010180 | A1 | 5/1994 |
| WO | 1994047598 | A1 | 9/1999 |
| WO | 1999048605 | A1 | 9/1999 |
| WO | 1999050311 | A1 | 10/1999 |
| WO | 199958582 | A1 | 11/1999 |
| WO | 1999060033 | A1 | 11/1999 |
| WO | 2008033197 | A2 | 3/2008 |
| WO | 2009064404 | A2 | 5/2009 |
| WO | 2011146044 | A1 | 11/2011 |
| WO | 2012027448 | A1 | 1/2012 |
| WO | 2014105411 | A1 | 7/2014 |
| WO | 2014105412 | A1 | 7/2014 |
| WO | 2014105413 | A1 | 7/2014 |
| WO | 2016003879 | A1 | 1/2016 |
| WO | 2016089935 | A1 | 9/2016 |
| WO | 2018022975 | A1 | 2/2018 |
| WO | 2018183056 | A1 | 10/2018 |

OTHER PUBLICATIONS

Japanese Notice of Refusal dated Jul. 8, 2025, pertaining to JP Patent Application No. 2022-567737, 8 pgs.
Singapore Office Action dated Jul. 17, 2025, pertaining to SG Patent Application No. 11202260508U, 9 pgs.
Singapore Office Action dated Jul. 17, 2025, pertaining to SG Patent Application No. 11202260536T, 10 pgs.
Singapore Office Action dated Jul. 17, 2025, pertaining to SG Patent Application No. 11202260283Y, 8 pgs.
Singapore Office Action dated Jul. 17, 2025, pertaining to SG Patent Application No. 11202260510S, 8 pgs.
Singapore Office Action dated Jul. 17, 2025, pertaining to SG Patent Application No. 11202260513T, 8 pgs.
Brazilian Technical Report dated Feb. 25, 2025, pertaining to BR Patent Application No. BR112022023862.2, 8 pgs.
Brazilian Technical Report dated Feb. 25, 2025, pertaining to BR Patent Application No. BR112022023905.0, 8 pgs.
Brazilian Technical Report dated Feb. 25, 2025, pertaining to BR Patent Application No. BR112022023884.3, 8 pgs.
Brazilian Technical Report dated Feb. 28, 2025, pertaining to BR Patent Application No. BR112022023873.8, 8 pgs.
Brazilian Technical Report dated Feb. 25, 2025, pertaining to BR Patent Application No. BR112022024087.2, 8 pgs.
International Search Report and Written Opinion dated Sep. 30, 2021, pertaining to Int'l Patent Application No. PCT/US2021/034866, 8 pgs.
International Search Report and Written Opinion dated Sep. 30, 2021, pertaining to Int'l Patent Application No. PCT/US2021/034878, 9 pgs.
International Search Report and Written Opinion dated Sep. 30, 2021, pertaining to Int'l Patent Application No. PCT/US2021/034868, 10 pgs.
International Search Report and Written Opinion dated Sep. 30, 2021, pertaining to Int'l Patent Application No. PCT/US2021/034864, 13 pgs.
International Search Report and Written Opinion dated Sep. 30, 2021, pertaining to Int'l Patent Application No. PCT/US2021/034871, 13 pgs.
Lee et al. "Toward Absolute Chemical Composition Distribution Measurement of Polyolefins by High-Temperature Liquid Chromatography Hyphenated with Infrared Absorbance and Light Scattering Detectors", Analytical Chemistry 2014 86 (17), 8649-8656.
Chinese Office Action dated Dec. 31, 2024, pertaining to CN Patent Application No. 202180037717.1, 6 pgs.
Chinese Office Action dated Sep. 30, 2024, pertaining to CN Patent Application No. 2021800377171, 16 pgs.
Chinese Office Action dated Oct. 14, 2024, pertaining to CN Patent Application No. 2021800379209, 8 pgs.
Chinese Office Action dated Jan. 17, 2024, pertaining to CN Patent Application No. 2021800380954, 14 pgs.
Chinese Office Action and Search Report dated Jan. 25, 2024, pertaining to CN Patent Application No. 202180037924.7, 17 pgs.
Chinese Office Action and Search Report dated Mar. 4, 2024, pertaining to CN Patent Application No. 202180037920.9, 20 pgs.
Chinese Office Action and Search Report dated Mar. 13, 2024, pertaining to CN Patent Application No. 202180037717.1, 16 pgs.
Saudi Arabia Examination Report dated Oct. 9, 2023, pertaining to SA Patent Application No. 522441492, 15 pgs.
Saudi Arabia Substantive Examination Report dated Oct. 11, 2023, pertaining to SA Patent Application No. 522441511, 15 pgs.
Chinese Office Action dated Apr. 25, 2024, pertaining to CN Patent Application No. 202180037607.5, 16 pgs.
European Article 94(3) dated Jun. 5, 2024, pertaining to EP Patent Application No. 21735492.7, 5 pgs.
European Article 94(3) dated Jun. 5, 2024, pertaining to EP Patent Application No. 21735490.1, 6 pgs.
European Article 94(3) dated Jun. 5, 2024, pertaining to EP Patent Application No. 21742208.8, 5 pgs.
European Article 94(3) dated Jun. 5, 2024, pertaining to EP Patent Application No. 21735493.5, 5 pgs.
Chinese Office Action dated Jul. 24, 2024, pertaining to CN Patent Application No. 202180037924.7, 18 pgs.
India First Examination Report dated Dec. 4, 2025, pertaining to IN Patent Application No. 202217068189, 6 pgs.
US Non-Final Office Action dated Oct. 28, 2025, pertaining to U.S. Appl. No. 18/000,033, 6 pgs.
US Non-Final Office Action dated Dec. 23, 2025, pertaining to U.S. Appl. No. 17/999,781, 9 pgs.
AEROSIL Fumed Silica Product Overview, Evonik Powerto Create, 2019, 20 pgs.
Japanese Office Action dated Jan. 6, 2026, pertaining to JP Patent Application No. 2022-567508, 4 pgs.
Korean Office Action dated Jan. 16, 2026, pertaining to KR Patent Application No. 10-2022-7044846, 9 pgs.
Korean Office Action dated Jan. 16, 2026, pertaining to KR Patent Application No. 10-2022-7044847, 11 pgs.
Korean Office Action dated Jan. 19, 2026, pertaining to KR Patent Application No. 10-2022-7044849, 8 pgs.
India Examination Report dated Jan. 19, 2026 pertaining to IN Patent Application No. 202217068052, 7 pgs.
India Examination Report dated Jan. 27, 2026 pertaining to IN Patent Application No. 202217068053, 7 pgs.
Japanese Notice of Reasons for Refusal dated Feb. 3, 2026, pertaining to JP Patent Application No. 2022-567500, 4 pgs.

(56) References Cited

OTHER PUBLICATIONS

Communication pursuant to Article 94(3) EPC dated Feb. 25, 2026, pertaining to EP Patent Application No. 21735490.1, 5 pgs.
Communication pursuant to Article 94(3) EPC dated Feb. 25, 2026, pertaining to EP Patent Application No. 21735492.7, 5 pgs.
Communication pursuant to Article 94(3) EPC dated Feb. 26, 2026, pertaining to EP Patent Application No. 21735493.5, 4 pgs.
Canadian Office Action dated Apr. 23, 2026, pertaining to CA Patent Application No. 3180282, 4 pgs.
Canadian Office Action dated Apr. 1, 2026, pertaining to CA Patent Application No. 3180275, 5 pgs.
Communication pursuant to Article 94(3) EPC dated Apr. 9, 2026, pertaining to EP Patent Application No. 24202827.2, 5 pgs.
Communication pursuant to Article 94(3) EPC dated Apr. 9, 2026, pertaining to EP Patent Application No. 24203285.2, 5 pgs.
Canadian Office Action dated Apr. 2, 2026, pertaining to CA Patent Application No. 3180273, 5 pgs.
Canadian Office Action dated Apr. 9, 2026, pertaining to CA Patent Application No. 3180279, 4 pgs.
Canadian Office Action dated Apr. 16, 2026, pertaining to CA Patent Application No. 3180280, 5 pgs.
U.S. Notice of Allowance dated Mar. 26, 2026, pertaining to U.S. Appl. No. 18/000,033, 7 pgs.

* cited by examiner

CATALYST SYSTEMS AND PROCESSES FOR PRODUCING POLYETHYLENE USING THE SAME

CROSS REFERENCE TO RELATED APPLICATIONS

This application is a National Phase Entry under 35 U.S.C. § 371 of International Patent Application No. PCT/US2021/034866 filed May 28, 2021, which claims priority to U.S. Provisional Patent Application No. 63/031,638 filed May 29, 2020, and U.S. Provisional Patent Application No. 63/143,333 filed Jan. 29, 2021, which are incorporated by reference in its entirety.

TECHNICAL FIELD

Embodiments of the present disclosure are generally directed to processes for producing polyethylene and, in particular, contacting ethylene and, optionally, one or more $(C_3-C_{12})\alpha$-olefin comonomers with germanium-bridged bis-phenylphenoxy catalyst systems in a gas-phase polymerization reactor.

BACKGROUND

Since the discovery of Ziegler and Natta on heterogeneous olefin polymerizations, global polyolefin production reached approximately 150 million tons per year in 2015, and continues to increase due to market demand. The catalyst systems in the polyolefin polymerization process may contribute to the characteristics and properties of such polyolefins. For example, catalyst systems that include bis-phenylphenoxy (BPP) metal-ligand complexes may produce polyolefins that have flat or reverse short-chain branching distributions (SCBD), relatively high levels of comonomer incorporation, high native molecular weights, and/or narrow-medium molecular weight distributions (MWD).

However, when utilized in some polymerization processes, such as gas-phase polymerization, catalyst systems that include BPP metal-ligand complexes may exhibit generally poor productivity. That is, catalyst systems that include BPP metal-ligand complexes may generally produce less polymer relative to the amount of the catalyst system used. Therefore, the use of catalyst systems that include BPP metal-ligand complexes may not be commercially viable in gas-phase polymerization processes.

SUMMARY

Accordingly, ongoing needs exist for catalyst systems that are suitable for use in gas-phase reactors and have improved productivity when utilized in gas-phase polymerization processes. Embodiments of the present disclosure address these needs by providing catalyst systems including BPP metal-ligand complexes having germanium-containing bridges. The catalyst systems, when utilized in gas-phase polymerization processes, exhibit a greatly increased productivity when compared to similar catalyst systems including BPP metal-ligand complexes without germanium-containing bridges.

Embodiments of the present disclosure include a procatalyst. The procatalyst includes a metal-ligand complex disposed on one or more support materials. The metal-ligand complex has a structure according to formula (I):

(I)

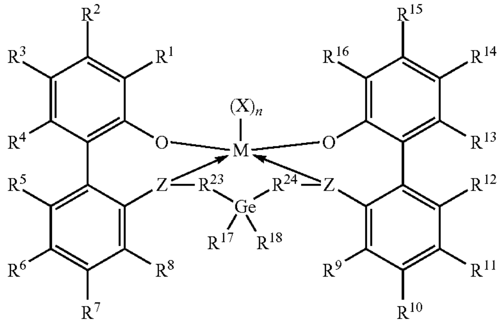

In formula (I), M is titanium, zirconium, or hafnium; subscript n of $(X)_n$ is 1, 2, or 3; each X is a monodentate ligand independently chosen from unsaturated $(C_2-C_{50})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_4-C_{50})$heteroaryl, halogen, $—N(R^N)_2$, and $—N(R^N)COR^C$; and the metal-ligand complex of formula (I) is overall charge-neutral.

In formula (I), each Z is independently chosen from —O—, —S—, $(C_6-C_{50})$aryl, $(C_4-C_{50})$heteroaryl, $N(C_1-C_{40})$hydrocarbyl, and $P(C_1-C_{40})$hydrocarbyl.

In formula (I), $R^1$ and $R^{16}$ are independently chosen from $(C_6-C_{50})$aryl, $(C_4-C_{50})$heteroaryl, $(C_1-C_{40})$alkyl, $(C_3-C_{40})$heteroalkyl, radicals having formula (II), radicals having formula (III), and radicals having formula (IV):

(II)

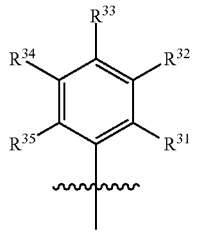

(III)

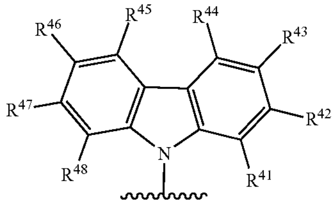

(IV)

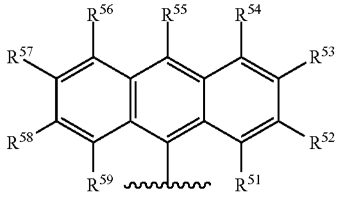

In formulas (II), (III), and (IV), $R^{31-35}$, $R^{41-48}$, and $R^{51-59}$ are independently chosen from —H, $(C_1-C_{50})$hydrocarbyl, $(C_1-C_{50})$heterohydrocarbyl, $—Si(R^C)_3$, $—Ge(R^C)_3$, $P(R^P)_2$, $—N(R^N)_2$, $—OR^C$, $SR^C$, $NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^C)_2NC(O)—$, or halogen.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R)—$, $(R^C)_2NC(O)—$, and halogen.

In formula (I), $R^{23}$ and $R^{24}$ are independently chosen from $—(CR^C{}_2)_m—$, wherein subscript m is from 1 to 10.

In formula (I), $R^{17}$ and $R^{18}$ are independently chosen from linear or branched $(C_1\text{-}C_{20})$alkyl.

In formulas (I), (II), (III), and (IV), each $R^C$, $R^P$, and $R^N$ are independently chosen from —H, $(C_1\text{-}C_{50})$hydrocarbyl, and $(C_1\text{-}C_{50})$heterohydrocarbyl.

Embodiments of the present disclosure include methods for producing a catalyst system. The method includes contacting one or more support materials, one or more activators, and a metal-ligand complex in an inert hydrocarbon solvent to produce the catalyst system.

Embodiments of the present disclosure include a process for producing polyethylene. The process includes contacting ethylene and, optionally, one or more $(C_3\text{-}C_{12})\alpha$-olefin comonomers with a catalyst system in a gas-phase polymerization reactor. The catalyst system comprises a metal-ligand complex disposed on one or more support materials.

These and additional features provided by the embodiments of the present disclosure will be more fully understood in view of the following detailed description.

DETAILED DESCRIPTION

Specific embodiments of procatalysts, catalyst systems, methods of producing catalyst systems, and processes for producing polyethylene will now be described. However, it should be understood that the systems, methods, and processes of the present disclosure may be embodied in different forms, and should not be construed as limited to the specific embodiments set forth in the present disclosure. Rather, embodiments are provided so that the present disclosure will be thorough and complete, and will fully convey the scope of the disclosed subject matter to those skilled in the art.

Common abbreviations used in the present disclosure are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-$d_6$; $CDCl_3$: deuterated chloroform; $Na_2SO_4$: sodium sulfate; $MgSO_4$: magnesium sulfate; HCL: hydrogen chloride; n-BuLi: butyllithium; t-BuLi: tert-butyllithium; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days.

The terms "halogen atom" or "halogen" mean the radical of a fluorine atom (F), chlorine atom (Cl), bromine atom (Br), or iodine atom (I). The term "halide" means the anionic form of the halogen atom: fluoride (F—), chloride (Cl—), bromide (Br), or iodide (I—).

The term "independently selected" means that the R groups, such as, $R^1$, $R^2$, and $R^3$, can be identical or different (e.g., $R^1$, $R^2$, and $R^3$ may all be substituted alkyls; or $R^1$ and $R^2$ may be a substituted alkyl, and $R^3$ may be an aryl). A chemical name associated with an R group is intended to convey the chemical structure that is recognized in the art as corresponding to that of the chemical name. As a result, chemical names are intended to supplement and illustrate, not preclude, the structural definitions known to those of skill in the art.

The term "procatalyst" means a compound that has catalytic activity when combined with an activator. The term "activator" means a compound that chemically reacts with a procatalyst in a manner that converts the procatalyst to a catalytically active compound. As used in the present disclosure, the terms "co-catalyst" and "activator" are interchangeable, and have identical meanings unless clearly specified.

The term "substitution" means that at least one hydrogen atom (—H) bonded to a carbon atom of a corresponding unsubstituted compound or functional group is replaced by a substituent (e.g., $R^S$). The term "—H" means a hydrogen or hydrogen radical that is covalently bonded to another atom. As used in the present disclosure, the terms "hydrogen" and "—H" are interchangeable, and have identical meanings unless clearly specified.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x\text{-}C_y)$" parenthetical may contain more than y carbon atoms depending on the identity of any groups $R^S$. For example, a "$(C_1\text{-}C_{50})$alkyl substituted with exactly one group $R^S$, where $R^S$ is phenyl ($—C_6H_5$)" may contain from 7 to 56 carbon atoms. As a result, when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "$(C_1\text{-}C_{50})$hydrocarbyl" means a hydrocarbon radical of from 1 to 50 carbon atoms and the term "$(C_1\text{-}C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted. As used in the present disclosure, a $(C_1\text{-}C_{50})$ hydrocarbyl may be an unsubstituted or substituted $(C_1\text{-}C_{50})$ alkyl, $(C_3\text{-}C_{50})$cycloalkyl, $(C_3\text{-}C_{25})$cycloalkyl-$(C_1\text{-}C_{25})$alkylene, $(C_6\text{-}C_{50})$aryl, or $(C_6\text{-}C_{25})$aryl-$(C_1\text{-}C_{25})$alkylene (such as benzyl ($—CH_2—C_6H_5$)).

The term "$(C_1\text{-}C_{50})$alkyl" means a saturated straight or branched hydrocarbon radical containing from 1 to 50 carbon atoms. Each $(C_1\text{-}C_{50})$alkyl may be unsubstituted or substituted by one or more $R^S$. In embodiments, each hydrogen atom in a hydrocarbon radical may be substituted with $R^S$, such as, for example, trifluoromethyl. Examples of unsubstituted $(C_1\text{-}C_{50})$alkyl are unsubstituted $(C_1\text{-}C_{20})$alkyl; unsubstituted $(C_1\text{-}C_{10})$alkyl; unsubstituted $(C_1\text{-}C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1\text{-}C_{50})$alkyl are substituted $(C_1\text{-}C_{20})$alkyl, substituted $(C_1\text{-}C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, such as, for example, methyl, trifluoromethyl, ethyl, 1-propyl, 1-methylethyl, or 1,1-dimethylethyl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{50})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{50})$cycloalkyl are substituted $(C_3-C_{20})$cycloalkyl, substituted $(C_3-C_{10})$cycloalkyl, and 1-fluorocyclohexyl.

The term "$(C_6-C_{50})$aryl" means an unsubstituted or substituted (by one or more $R^S$) mono-, bi- or tricyclic aromatic hydrocarbon radical of from 6 to 50 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{15})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrabydronaphthyl; and phenanthrene. Examples of substituted $(C_6-C_{50})$aryl include: substituted $(C_1-C_2)$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, $—N{=}C(R^C)_2$, $—Ge(R^C)_2—$, or $—Si(R^C)—$, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 11H-benzo[f]indol-1-yl. An example of the fused 6,5,6-ring system is 9H-carbazol-9-yl. An example of the fused 6,5,6-ring system is 91-carbazol-9-yl. An example of the fused 6,6,6-ring system is acrydin-9-yl.

The term "polymer" refers to polymeric compounds prepared by polymerizing monomers, whether of the same or a different type. The generic term polymer thus includes homopolymers, which are polymers prepared by polymerizing only one monomer, and copolymers, which are polymers prepared by polymerizing two or more different monomers.

The term "interpolymer" refers to polymers prepared by polymerizing at least two different types of monomers. The generic term interpolymer thus includes copolymers and other polymers prepared by polymerizing more than two different monomers, such as terpolymers.

The terms "polyolefin," "polyolefin polymer," and "polyolefin resin" refer to polymers prepared by polymerizing a simple olefin (also referred to as an alkene, which has the general formula $C_nH_{2n}$) monomer. The generic term polyolefin thus includes polymers prepared by polymerizing ethylene monomer with or without one or more comonomers, such as polyethylene, and polymers prepared by polymerizing propylene monomer with or without one or more comonomers, such as polypropylene.

The terms "polyethylene" and "ethylene-based polymer" refer to polyolefins comprising greater than 50 percent (%) by mole of units that have been derived from ethylene monomer, which includes polyethylene homopolymers and copolymers. Common forms of polyethylene known in the art include Low Density Polyethylene (LDPE), Linear Low Density Polyethylene (LLDPE), Ultra Low Density Polyethylene (ULDPE), Very Low Density Polyethylene (VLDPE), Medium Density Polyethylene (MDPE), and High Density Polyethylene (HDPE).

The term "molecular weight distribution" means a ratio of two different molecular weights of a polymer. The generic term molecular weight distribution includes a ratio of a weight average molecular weight ($M_w$) of a polymer to a number average molecular weight ($M_n$) of the polymer, which may also be referred to as a "molecular weight distribution ($M_w/M_n$)," and a ratio of a z-average molecular weight ($M_z$) of a polymer to a weight average molecular weight ($M_w$) of the polymer, which may also be referred to as a "molecular weight distribution ($M_z/M_w$)."

The term "composition" means a mixture of materials that comprises the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

In embodiments, the catalyst system includes a procatalyst. The procatalyst includes a metal-ligand complex. The metal-ligand complex may have a structure according to formula (I):

(I)

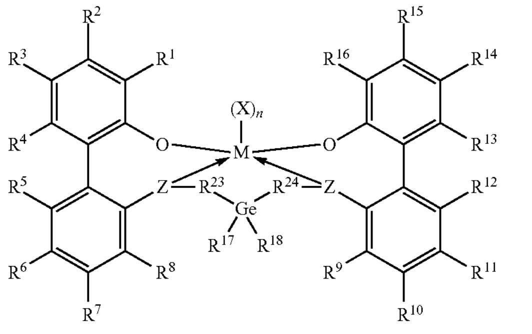

In formula (I), M is titanium (Ti), zirconium (Zr), or hafnium (H). In embodiments, M is titanium, zirconium, or hafnium, each independently being in a formal oxidation state of +2, +3, or +4.

In formula (I), subscript n of $(X)_n$ is 1, 2, or 3, and each X is a monodentate ligand independently chosen from unsaturated ($C_2$-$C_{50}$)hydrocarbon, unsaturated ($C_2$-$C_{50}$)heterohydrocarbon, ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, halogen, —$N(R^N)_2$, and —$N(R^N)COR^C$. In embodiments, each X is independently chosen from methyl; ethyl; 1-propyl; 2-propyl; 1-butyl; 2,2,-dimethylpropyl; trimethylsilylmethyl; phenyl; benzyl; or chloro. In some embodiments, subscript n of $(X)_n$ is 2 and each X is the same. In other embodiments, at least two X are different. For example, subscript n of (X)n may be 2 and each X may be a different one of methyl; ethyl; 1-propyl; 2-propyl; 1-butyl; 2,2,-dimethylpropyl; trimethylsilylmethyl; phenyl; benzyl; and chloro. In embodiments, subscript n of $(X)_n$ is 1 or 2 and at least two X independently are monoanionic monodentate ligands and a third X, if present, is a neutral monodentate ligand. In or more embodiments, subscript n of $(X)_n$ is 2. In formula (I), the metal-ligand complex is overall charge-neutral.

In formula (I), each Z is independently chosen from —O—, —S—, ($C_6$-$C_{50}$)aryl, ($C_4$-$C_{50}$)heteroaryl, N($C_1$-$C_{50}$)hydrocarbyl, and P($C_1$-$C_{50}$)hydrocarbyl. In embodiments, each Z is the same. For example, each Z may be —O—.

In formula (I), $R^1$ and $R^{16}$ are independently chosen from ($C_6$-$C_{50}$)aryl, ($C_4$-$C_{50}$)heteroaryl, ($C_1$-$C_{50}$)alkyl, ($C_3$-$C_{40}$) heteroalkyl, radicals having formula (II), radicals having formula (III), and radicals having formula (IV):

(II)

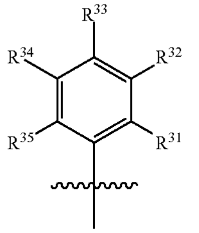

(III)

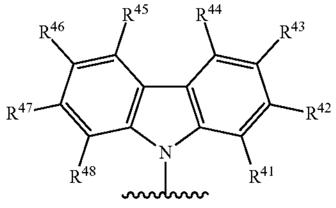

(IV)

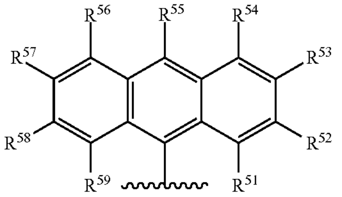

In formula (II), $R^{31}$, $R^{32}$, $R^{33}$, $R^{34}$, $R^{35}$ are independently chosen from —H, ($C_1$-$C_{50}$)hydrocarbyl, ($C_1$-$C_{50}$)heterohydrocarbyl, —$Si(R^C)_3$, —$Ge(R^C)_3$, $P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^C)_2NC(O)$—, or halogen.

In formula (III), $R^{41}$, $R^{42}$, $R^{43}$, $R^{44}$, $R^{45}$, $R^{46}$, $R^{47}$, $R^{48}$ are independently chosen from —H, ($C_1$-$C_{50}$)hydrocarbyl, ($C_1$-$C_{50}$)heterohydrocarbyl, —$Si(R^C)_3$, —$Ge(R^C)_3$, $P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^C)_2NC(O)$—, or halogen.

In formula (IV), $R^{51}$, $R^{52}$, $R^{53}$, $R^{54}$, $R^{55}$, $R^{56}$, $R^{57}$, $R^{58}$, and $R^{59}$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, $P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^C)_2NC(O)$—, or halogen.

The groups $R^1$ and $R^{16}$ in the metal-ligand complex of formula (I) are chosen independently of one another. For example, $R^1$ may be chosen from a radical having formula (II), (III), or (IV), and $R^{16}$ may be a $(C_4\text{-}C_{50})$heteroaryl; or $R^1$ may be chosen from a radical having formula (II), (III), or (IV), and $R^{16}$ may be chosen from a radical having formula (II), (III), or (IV), the same as or different from that of $R^1$. In embodiments, both $R^1$ and $R^{16}$ are radicals having formula (II), for which the groups $R^{31\text{-}35}$ are the same or different in $R^1$ and $R^{16}$. In some embodiments, both $R^1$ and $R^{16}$ are radicals having formula (III), for which the groups $R^{41\text{-}48}$ are the same or different in $R^1$ and $R^{16}$. In other embodiments, both $R^1$ and $R^{16}$ are radicals having formula (IV), for which the groups $R^{51\text{-}59}$ are the same or different in $R^1$ and $R^{16}$.

In embodiments, at least one of $R^1$ and $R^{16}$ is a radical having formula (II), where at least one of $R^{32}$ and $R^{34}$ are tert-butyl. In some embodiments, when at least one of $R^1$ or $R^{16}$ is a radical having formula (III), one of or both of $R^{43}$ and $R^{46}$ is tert-butyl and $R^{41\text{-}42}$, $R^{44\text{-}45}$, and $R^{47\text{-}48}$ are —H. In other embodiments, one of or both of $R^{42}$ and $R^{47}$ is tert-butyl and $R^{41}$, $R^{43\text{-}46}$, and $R^{48}$ are —H. In some embodiments, both $R^{42}$ and $R^{47}$ are —H. In some embodiments, $R^{41\text{-}48}$ are —H.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, $P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R)$—, $(R^C)_2NC(O)$—, and halogen.

In some embodiments, at least one of $R^5$, $R^6$, $R^7$, and $R^8$ is a halogen atom; and at least one of $R^9$, $R^{10}$, $R^1$, and $R^{12}$ is a halogen atom. In some embodiments, at least two of $R^5$, $R^6$, $R^7$, and $R^8$ are halogen atoms; and at least two of $R^9$, $R^{10}$, $R^{11}$, and $R^{12}$ are halogen atoms. In various embodiments, at least three of $R^5$, $R^6$, $R^7$, and $R^8$ are halogen atoms; and at least three of $R^9$, $R^{10}$, $R^{11}$, and $R^{12}$ are halogen atoms.

In embodiments, $R^3$ and $R^{14}$ are $(C_1\text{-}C_{24})$alkyl. In various embodiments, $R^3$ and $R^{14}$ are $(C_1\text{-}C_{20})$alkyl. In some embodiments, $R^3$ and $R^{14}$ are $(C_4\text{-}C_{24})$alkyl. In one or more embodiments, $R^3$ and $R^{14}$ are $(C_8\text{-}C_{12})$alkyl. In some embodiments, $R^3$ and $R^{14}$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^3$ and $R^{14}$ are —$OR^C$, wherein $R^C$ is $(C_1\text{-}C_{20})$hydrocarbon, and in some embodiments, $R^C$ is methyl, ethyl, 1-propyl, 2-propyl (also called iso-propyl), or 1,1-dimethylethyl.

In embodiments, $R^3$ and $R^{14}$ are methyl. In other embodiments, $R^3$ and $R^{14}$ are $(C_4\text{-}C_{24})$alkyl. In some embodiments, $R^8$ and $R^9$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In some embodiments, $R^6$ and $R^{11}$ are halogen. In other embodiments, $R^6$ and $R^{11}$ are $(C_1\text{-}C_{24})$alkyl. In some embodiments, $R^6$ and $R^{11}$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^6$ and $R^{11}$ are —$OR^C$, wherein $R^C$ is $(C_1\text{-}C_{20})$hydrocarbyl, and in some embodiments, $R^C$ is methyl, ethyl, 1-propyl, 2-propyl (also called iso-propyl), or 1,1-dimethylethyl. In other embodiments, $R^6$ and $R^{11}$ are —$SiR^C_3$, wherein each $R^C$ is independently $(C_1\text{-}C_{20})$hydrocarbyl, and in some embodiments, $R^C$ is methyl, ethyl, 1-propyl, 2-propyl (also called iso-propyl), or 1,1-dimethylethyl.

In some embodiments, $R^3$ and $R^{14}$ are methyl and $R^6$ and $R^{11}$ are halogen. In other embodiments, $R^6$ and $R^{11}$ are tert-butyl. In other embodiments, $R^3$ and $R^{14}$ are tert-octyl or n-octyl.

In formula (I), $R^{23}$ and $R^{24}$ are independently chosen from —$(CR^C_2)_m$—, wherein subscript m is from 1 to 10. In one or more embodiments, each subscript m is 1 or 2.

In formula (I), $R^{17}$ and $R^{18}$ are independently chosen from linear or branched $(C_1\text{-}C_{20})$alkyl. In some embodiments, $R^{17}$ and $R^{18}$ are independently chosen from linear or branched $(C_2\text{-}C_{20})$alkyl, $(C_3\text{-}C_7)$alkyl, or $(C_4\text{-}C_7)$cycloalkyl.

In formulas (I), (II), (III), and (IV), each $R^C$, $R^P$, and $R^N$ are independently chosen from —H, $(C_1\text{-}C_{50})$hydrocarbyl, and $(C_1\text{-}C_{50})$heterohydrocarbyl.

In embodiments, the procatalyst may be rendered catalytically active by contacting it to, or combining it with, an activator. A procatalyst that has been rendered catalytically active by contacting it to, or combining it with, an activator may be referred to as a "catalyst system." That is, as used in the present disclosure, a catalyst system may include a procatalyst and one or more activators. The term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively, or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

When the metal-ligand complex is rendered catalytically active by an activator, the metal of the metal-ligand complex may have a formal charge of positive one (+1). In embodiments in which the procatalyst includes the metal-ligand complex, the metal-ligand complex has a structure according to formula (I) and is overall charge neutral. In embodiments in which the catalyst system includes the metal-ligand complex, the metal-ligand complex may have a structure according to formula (Ia) and has an overall formal charge of positive one (+1):

(Ia)

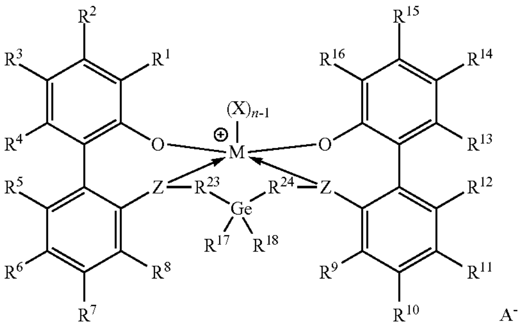

In formula (Ia), $A^-$ is an anion, and M, subscript n of $(X)_n$, each X, each Z, $R^1$-$R^{16}$, $R^{17-18}$, and $R^{23-24}$ are as described previously with regard to the metal-ligand complex of formula (I).

Formula (Ia) is a illustrative depiction of an active catalyst.

In embodiments, the metal-ligand complex, the activator, or both, may be disposed on one or more support materials. For example, the metal-ligand complex may be deposited on, contacted with, vaporized with, bonded to, or incorporated within, adsorbed or absorbed in, or on, one or more support materials. The metal-ligand complex may be combined with one or more support materials using one of the support methods well known in the art or as described below. As used in the present disclosure, the metal-ligand complex is in a supported form, for example, when deposited on, contacted with, or incorporated within, adsorbed or absorbed in, or on, one or more support materials.

Suitable support materials, such as inorganic oxides, include oxides of metals of Group 2, 3, 4, 5, 13 or 14 of the IUPAC periodic table. In embodiments, support materials include silica, which may or may not be dehydrated, fumed silica, alumina (e.g., as described in International Patent Application No. 1999/060033), silica-alumina, and mixtures of these. The fumed silica may be hydrophilic (untreated), alternatively hydrophobic (treated). In embodiments, the support material is hydrophobic fumed silica, which may be prepared by treating an untreated fumed silica with a treating agent, such as dimethyldichlorosilane, a polydimethylsiloxane fluid, or hexamethyldisilazane. In some embodiments, support materials include magnesia, titania, zirconia, magnesium chloride (e.g., as described in U.S. Pat. No. 5,965,477), montmorillonite (e.g., as described in European Patent No. 0 511 665), phyllosilicate, zeolites, tale, clays (e.g., as described in U.S. Pat. No. 6,034,187), and mixtures of these. In other embodiments, combinations of these support materials may be used, such as, for example, silica-chromium, silica-alumina, silica-titania, and combinations of these. Additional support materials may also include those porous acrylic polymers described in European Patent No. 0 767 184. Other support materials may also include nanocomposites described in International Patent Application No. 1999/047598; aerogels described in International Patent Application No. 1999/048605; spherulites described in U.S. Pat. No. 5,972,510; and polymeric beads described in International Patent Application No. 1999/050311.

In embodiments, the support material has a surface area of from 10 square meters per gram ($m^2/g$) to 700 $m^2/g$, a pore volume of from 0.1 cubic meters per gram ($cm^3/g$) to 4.0 $cm^3/g$, and an average particle size of from 5 microns (μm) to 500 μm. In some embodiments, the support material has a surface area of from 50 $m^2/g$ to 500 $m^2/g$, a pore volume of from 0.5 $cm^3/g$ to 3.5 $cm^3/g$, and an average particle size of from 10 μm to 200 μm. In other embodiments, the support material may have a surface area of from 100 $m^2/g$ to 400 $m^2/g$, a pore volume from 0.8 $cm^3/g$ to 3.0 $cm^3/g$, and an average particle size of from 5 μm to 100 μm. The average pore size of the support material is typically from 10 Angstroms (Å) to 1,000 Å, such as from 50 Å to 500 Å or from 75 Å to 350 Å.

There are various suitable methods to produce the catalyst systems of the present disclosure. In one or more embodiments, methods for producing the catalyst system include contacting one or more support materials, one or more activators, and a metal-ligand complex in an inert hydrocarbon solvent to produce the catalyst system. In some embodiments, the method for producing the catalyst system may include disposing the one or more activators on the one or more support materials to produce a supported activator, and contacting the supported activator with a solution of the metal-ligand complex in an inert hydrocarbon solvent (often referred to as a "trim catalyst" or a "trim feed"). For example, in some embodiments, methods for producing the catalyst system include contacting a spray-dried supported activator (i.e., a supported activator produced via pray drying) with a solution of the metal-ligand complex in an inert hydrocarbon solvent. In some embodiments, the supported activator may be included in a slurry, such as, for example a mineral oil slurry.

In some embodiments, the method for producing the catalyst system may include mixing one or more support materials, one or more activators, and a metal-ligand complex to produce a catalyst system precursor. The methods may further include drying the catalyst system precursor to produce the catalyst system. More specifically, the methods may include making a mixture of the metal-ligand complex, one or more support materials, one or more activators, or a combinations of these, and an inert hydrocarbon solvent. The inert hydrocarbon solvent may then be removed from the mixture so as to produce the metal-ligand complex, the one or more activators, or combinations of these, disposed on the one or more support materials. In embodiments, the removing step may be achieved via conventional evaporating of the inert hydrocarbon solvent from the mixture (i.e., conventional concentrating method), which yields an evaporated/supported catalyst system. In other embodiments, the removing step may be achieved by spray-drying the mixture, which produces spray-dried particles. It should be understood that the drying and/or removing steps may not result in the complete removal of liquids from the resulting catalyst system. That is, the catalyst system may include residual amounts (i.e., from 1 wt. % to 3 wt. %) of the inert hydrocarbon solvent.

As noted above, the catalyst systems of the present disclosure may be utilized in processes for producing polymers, such as polyethylene, via the polymerization of olefins, such as ethylene. In embodiments, one or more olefins may be contacted with the catalyst systems of the present disclosure in a gas-phase polymerization reactor, such as a gas-phase fluidized bed polymerization reactor. Exemplary gas-phase systems are described in U.S. Pat. Nos. 5,665,818; 5,677,375; and 6,472,484; and European Patent Nos. 0 517 868 and 0 794 200. For example, in some embodiments, ethylene and, optionally, one or more ($C_3$-$C_{12}$)α-olefin comonomers may be contacted with the catalyst systems of the present disclosure in a gas-phase polymerization reactor. The catalyst system may be fed to the gas-phase polymerization reactor in neat form (i.e., as a dry solid), as a solution, or as a slurry. For example, in some embodiments, spray-dried particles of the catalyst system may be fed directly to the gas-phase polymerization reactor. In other embodiments, a solution or slurry of the catalyst system in a solvent, such as an inert hydrocarbon or mineral oil, may be fed to the reactor. For example, the procatalyst may be fed to the reactor in an inert hydrocarbon solution and the activator may be fed to the reactor in a mineral oil slurry.

In embodiments, the gas-phase polymerization reactor comprises a fluidized bed reactor. A fluidized bed reactor may include a "reaction zone" and a "velocity reduction zone." The reaction zone may include a bed of growing polymer particles, formed polymer particles, and a minor amount of the catalyst system fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; European Patent No. 0 802 202; and Belgian Patent No. 839,380.

In embodiments, the reactor temperature of the gas-phase polymerization reactor is from 30° C. to 150° C. For example, the reactor temperature of the gas-phase polymerization reactor may be from 30° C. to 120° C., from 30° C. to 110° C., from 30° C. to 100° C., from 30° C. to 90° C., from 30° C. to 50° C., from 30° C. to 40° C., from 40° C. to 150° C., from 40° C. to 120° C., from 40° C. to 110° C., from 40° C. to 100° C., from 40° C. to 90° C., from 40° C. to 50° C., from 50° C. to 150° C., from 50° C. to 120° C., from 50° C. to 110° C., from 50° C. to 100° C., from 50° C. to 90° C., from 90° C. to 150° C., from 90° C. to 120° C., from 90° C. to 110° C., from 90° C. to 100° C., from 100° C. to 150° C., from 100° C. to 120° C., from 100° C. to 110° C., from 110° C. to 150° C., from 110° C. to 120° C., or from 120° C. to 150° C. Generally, the gas-phase polymerization reactor may be operated at the highest temperature feasible, taking into account the sintering temperature of the polymer product within the reactor. Regardless of the process used to make the polyethylene, the reactor temperature should be below the melting or "sintering" temperature of the polymer product. As a result, the upper temperature limit may be the melting temperature of the polymer product.

In embodiments, the reactor pressure of the gas-phase polymerization reactor is from 690 kPa (100 psig) to 3,448 kPa (500 psig). For example, the reactor pressure of the gas-phase polymerization reactor may be from 690 kPa (100 psig) to 2,759 kPa (400 psig), from 690 kPa (100 psig) to 2,414 kPa (350 psig), from 690 kPa (100 psig) to 1,724 kPa (250 psig), from 690 kPa (100 psig) to 1,379 kPa (200 psig), from 1,379 kPa (200 psig) to 3,448 kPa (500 psig), from 1,379 kPa (200 psig) to 2,759 kPa (400 psig), from 1,379 kPa (200 psig) to 2,414 kPa (350 psig), from 1,379 kPa (200 psig) to 1,724 kPa (250 psig), from 1,724 kPa (250 psig) to 3,448 kPa (500 psig), from 1,724 kPa (250 psig) to 2,759 kPa (400 psig), from 1,724 kPa (250 psig) to 2,414 kPa (350 psig), from 2,414 kPa (350 psig) to 3,448 kPa (500 psig), from 2,414 kPa (350 psig) to 2,759 kPa (400 psig), or from 2,759 kPa (400 psig) to 3,448 kPa (500 psig).

In embodiments, hydrogen gas may be used in during polymerization to control the final properties of the polyethylene. The amount of hydrogen in the polymerization may be expressed as a mole ratio relative to the total polymerizable monomer, such as, for example, ethylene or a blend of ethylene and 1-hexene. The amount of hydrogen used in the polymerization process may be an amount necessary to achieve the desired properties of the polyethylene, such as, for example, melt flow rate (MFR). In embodiments, the mole ratio of hydrogen to total polymerizable monomer ($H_2$:monomer) is greater than 0.0001. For example, the mole ratio of hydrogen to total polymerizable monomer ($H_2$:monomer) may be from 0.0001 to 10, from 0.0001 to 5, from 0.0001 to 3, from 0.0001 to 0.10, from 0.0001 to 0.001, from 0.0001 to 0.0005, from 0.0005 to 10, from 0.0005 to 5, from 0.0005 to 3, from 0.0005 to 0.10, from 0.0005 to 0.001, from 0.001 to 10, from 0.001 to 5, from 0.001 to 3, from 0.001 to 0.10, from 0.10 to 10, from 0.10 to 5, from 0.10 to 3, from 3 to 10, from 3 to 5, or from 5 to 10.

In embodiments, the catalyst systems of the present disclosure may be utilized to polymerize a single type of olefin, producing a homopolymer. However, additional α-olefins may be incorporated into the polymerization scheme in other embodiments. The additional α-olefin comonomers typically have no more than 20 carbon atoms. For example, the catalyst systems of the present disclosure may be utilized to polymerize ethylene and one or more ($C_3$-$C_{12}$)α-olefin comonomers. Exemplary α-olefin comonomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or, in the alternative, from the group consisting of 1-hexene and 1-octene.

In embodiments, the one or more ($C_3$-$C_{12}$)α-olefin comonomers may not be derived from propylene. That is, the one or more ($C_3$-$C_{12}$)α-olefin comonomers may be substantially free of propylene. The term "substantially free" of a compound means the material or mixture includes less than 1.0 wt. % of the compound. For example, the one or more ($C_3$-$C_{12}$)α-olefin comonomers, which may be substantially free of propylene, may include less than 1.0 wt. % propylene, such as less than 0.8 wt. % propylene, less than 0.6 wt. % propylene, less than 0.4 wt. % propylene, or less than 0.2 wt. % propylene.

In embodiments, the polyethylene produced, for example homopolymers and/or interpolymers (including copolymers) of ethylene and, optionally, one or more comonomers may include at least 50 mole percent (mol. %) monomer units derived from ethylene. For example, the polyethylene may include at least 60 mol. %, at least 70 mol. %, at least 80 mol. %, or at least 90 mol. % monomer units derived from ethylene. In embodiments, the polyethylene includes from 50 mol. % to 100 mol. % monomer units derived from ethylene. For example, the polyethylene may include from 50 mol. % to 90 mol. %, from 50 mol. % to 80 mol. %, from 50 mol. % to 70 mol. %, from 50 mol. % to 60 mol. %, from 60 mol. % to 100 mol. %, from 60 mol. % to 90 mol. %, from 60 mol. % to 80 mol. %, from 60 mol. % to 70 mol. %, from 70 mol. % to 100 mol. %, from 70 mol. % to 90 mol. %, from 70 mol. % to 80 mol. %, from 80 mol. % to 100 mol. %, from 80 mol. % to 90 mol. %, or from 90 mol. % to 100 mol. % monomer units derived from ethylene.

In embodiments, the polyethylene produced includes at least 90 mol. % monomer units derived from ethylene. For example, the polyethylene may include at least 93 mol. %, at least 96 mol. %, at least 97 mol. %, or at least 99 mol. % monomer units derived from ethylene. In embodiments, the polyethylene includes from 90 mol. % to 100 mol. % monomer units derived from ethylene. For example, the polyethylene may include from 90 mol. % to 99.5 mol. %, from 90 mol. % to 99 mol. %, from 90 mol. % to 97 mol. %, from 90 mol. % to 96 mol. %, from 90 mol. % to 93 mol. %, from 93 mol. % to 100 mol. %, from 93 mol. % to 99.5 mol. %, from 93 mol. % to 99 mol. %, from 93 mol. % to 97 mol. %, from 93 mol. % to 96 mol. %, from 96 mol. % to 100 mol. %, from 96 mol. % to 99.5 mol. %, from 96 mol. % to 99 mol. %, from 96 mol. % to 97 mol. %, from 97 mol. % to 100 mol. %, from 97 mol. % to 99.5 mol. %, from 97 mol. % to 99 mol. %, from 99 mol. % to 100 mol. %, from 99 mol. % to 99.5 mol. %, or from 99.5 mol. % to 100 mol. % monomer units derived from ethylene.

In embodiments, the polyethylene produced includes less than 50 mol. % monomer units derived from an additional α-olefin. For example, the polyethylene may include less than 40 mol %, less than 30 mol. %, less than 20 mol. % or less than 10 mol. % monomer units derived from an additional α-olefin. In embodiments, the polyethylene includes from 0 mol. % to 50 mol. % monomer units derived from an additional α-olefin. For example, the polyethylene may include from 0 mol. % to 40 mol. %, from 0 mol. % to 30 mol. %, from 0 mol. % to 20 mol. %, from 0 mol. % to 10 mol. %, from 0 mol. % to 5 mol. %, from 0 mol. % to 1 mol. %, from 1 mol. % to 50 mol. %, from 1 mol. % to 40 mol. %, from 1 mol. % to 30 mol. %, from 1 mol. % to 20 mol. %, from 1 mol. % to 10 mol. %, from 1 mol. % to 5 mol. %, from 5 mol. % to 50 mol. %, from 5 mol. % to 40 mol. %, from 5 mol. % to 30 mol. %, from 5 mol. % to 20 mol. %, from 5 mol. % to 10 mol. %, from 10 mol. % to 50 mol. %, from 10 mol. % to 40 mol. %, from 10 mol. % to 30 mol. %, from 10 mol. % to 20 mol. %, from 20 mol. % to 50 mol. %, from 20 mol. % to 40 mol. %, from 20 mol. % to 30 mol. %, from 30 mol. % to 50 mol. %, from 30 mol. % to 40 mol. %, or from 40 mol. % to 50 mol. % monomer units derived from an additional α-olefin.

In embodiments, the polyethylene produced further includes one or more additives. Such additives include, but are not limited to, antistatic agents, color enhancers, dyes, lubricants, pigments, primary antioxidants, secondary antioxidants, processing aids, ultraviolet (UV) stabilizers, and combinations of these. The polyethylene may include any amounts of additives. In embodiments, the produced polyethylene further includes fillers, which may include, but are not limited to, organic or inorganic fillers, such as, for example, calcium carbonate, talc, or $Mg(OH)_2$.

The produced polyethylene may be used in a wide variety of products and end-use applications. The produced polyethylene may also be blended and/or co-extruded with any other polymer. Non-limiting examples of other polymers include linear low density polyethylene, elastomers, plastomers, high pressure low density polyethylene, high density polyethylene, polypropylenes, and the like. The produced polyethylene and blends including the produced polyethylene may be used to produce blow-molded components or products, among various other end uses. The produced polyethylene and blends including the produced polyethylene may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

Test Methods

Polymerization Activity

Unless indicated otherwise, all polymerization activities (also referred to as productivities) presently disclosed were determined as a ratio of polymer produced to the amount of catalyst added to the reactor and are reported in grams of polymer per grams of catalyst per hour (gPE/gcat/hr).

Comonomer Content

Unless indicated otherwise, all comonomer contents (i.e., the amount of comonomer incorporated into a polymer) presently disclosed were determined by rapid FT-IR spectroscopy on dissolved polymer in a Gel Permeation Chromatography (GPC) measurement and are reported in weight percent (wt. %). The comonomer content of a polymer can be determined with respect to polymer molecular weight by use of an infrared detector, such as an IR5 detector, in a GPC measurement, as described in Lee et al., *Toward absolute chemical composition distribution measurement of polyolefins by high-temperature liquid chromatography hyphenated with infrared absorbance and light scattering detectors,* 86 ANAL. CHEM. 8649 (2014).

High Load Melt Index ($I_{21}$)

Unless indicated otherwise, all high load melt indices ($I_{21}$) disclosed herein were measured according to ASTM D1238-10, Method B, at 190° C. and a 21.6 kg load, and are reported in decigrams per minute (dg/min).

Melt Temperature ($T_m$)

Unless indicated otherwise, all melt temperatures ($T_m$) disclosed herein were measured according to ASTM D3418-08 and are reported in degrees Celsius (° C.). Unless indicated otherwise, a scan rate of 10 degrees Celsius per minute (° C./min) on a 10 milligram (mg) sample was used, and the second heating cycle was used to determine the melt temperature ($T_m$).

Uptake Ratio

Unless indicated otherwise, all uptake ratios presently disclosed were determined as a ratio of an amount of monomer units derived from a comonomer (e.g., a ($C_3$-$C_{12}$) α-olefin comonomer) to an amount of monomer units derived from ethylene.

Molecular Weight

Unless indicated otherwise, all molecular weights disclosed herein, including weight average molecular weight ($M_w$), number average molecular weight ($M_n$), and z-average molecular weight ($M_z$), were measured using conventional GPC and are reported in grams per mole (g/mol).

The chromatographic system consisted of a High Temperature Gel Permeation Chromatography (Polymer Laboratories), equipped with a differential refractive index detector (DRI). Three Polymer Laboratories PLgel 10 μm Mixed-B columns were used. The nominal flow rate was 1.0 mL/min, and the nominal injection volume was 300 μL. The various transfer lines, columns, and differential refractometer (the DRI detector) were contained in an oven maintained at 160° C. The solvent for the experiment was prepared by dissolving 6 grams of butylated hydroxytoluene as an antioxidant in 4 liters of Aldrich reagent-grade 1,2,4-trichlorobenzene (TCB). The TCB mixture was then filtered through a 0.1 μm Teflon filter. The TCB was then degassed with an online degasser before entering the GPC instrument.

The polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2.0 mg/ml, with lower concentrations being used for higher molecular weight samples. Prior to running each sample the DRI detector was purged. The flow rate in the apparatus was then increased to 1.0 ml/minute, and the DRI was allowed to stabilize for 8 hours before injecting the first sample. The molecular weight was determined by combining universal calibration relationship with the column calibration which is performed with a series of monodispersed polystyrene (PS) standards. The MW was calculated at each elution volume with following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $\alpha_{PS}$=0.67 and $K_{PS}$0.000175, while $\alpha_X$ and $K_X$ were obtained from published literature. Specifically, a/K=0.695/0.000579 for PE and 0.705/0.0002288 for PP.

The concentration, c, at each point in the chromatogram was calculated from the baseline-subtracted DRI signal, IDRI, using the following equation:

$$c = \frac{KDRI \times IDRI}{dn/dc}$$

where KDRI is a constant determined by calibrating the DRI, and (dn/dc) is the refractive index increment for the system. Specifically, dn/dc=0.109 for polyethylene.

The mass recovery was calculated from the ratio of the integrated area of the concentration chromatography over elution volume and the injection mass which is equal to the pre-determined concentration multiplied by injection loop volume.

EXAMPLES

Synthesis of Metal-Ligand Complex 1 (MLC-1)

Synthesis of 2-[5-tert-butyl-2-[[[4-tert-butyl-2-[3-(3,6-ditert-butylcarbazol-9-yl)-2-hydroxy-5-(1,1,3,3-tetramethylbutyl)phenyl]phenoxy]methyl-diisopropyl-germyl]methoxy]phenyl]-6-(3,6-ditert-butylcarbazol-9-yl)-4-(1,1,3,3-tetramethylbutyl)phenol

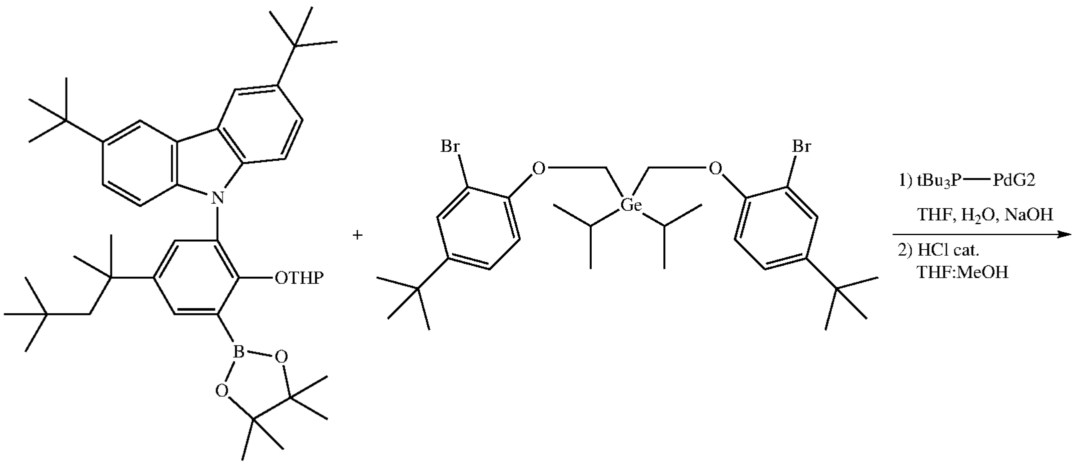

-continued

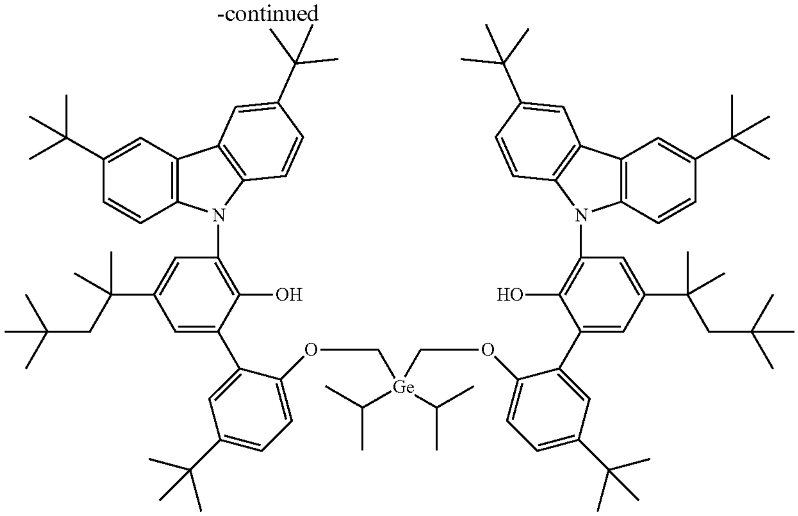

Degassed toluene (15 ml) and degassed water (5 mL) were added to a 40 mL vial charged with 3,6-di-tert-butyl-9-[2-tetrahydropyran-2-yloxy-5-(1,1,3,3-tetramethylbutyl)-3-(4,4,5,5-tetramethyl-1,3,2-dioxaborolan-2-yl)phenyl]carbazole (4.14 g, 5.97 mmol), bis[(2-bromo-4-tert-butyl-phenoxy)methyl]-diisopropyl-germane (1.6 g, 2.49 mmol), $tBu_3P$-PdG2 (0.05 g, 0.1 mmol), and NaOH (0.5 g, 12.4 mmol). The reaction was warmed to 50° C. and maintained at this temperature for 18 h. After this time, the reaction was cooled to room temperature. The mixture was transferred to a separatory funnel, $Et_2O$ (20 mL) and $H_2O$ (10 mL) were added, and the layers were separated. The aqueous phase was extracted with additional $Et_2O$ (10 mL). The combined organics were washed with brine (10 mL), dried ($Na_2SO_4$), and filtered into a 100 mL roundbottom flask. The solvent was removed under reduced pressure. The crude residue was dissolved in MeOH/THF (1:1, 20 mL), concentrated HCl (5 drops from a glass pipet) was added, a reflux condenser was fitted to the flask, then the solution was warmed to 70° C. while stirring. After 18 hours the solvent was removed under reduced pressure. The yellow oil was rotovapped from MeOH (3x3 mL), and a tan solid formed. MeOH (20 mL) was added to the solid, which was then collected by filtration. The solid was washed with MeOH (2x8 mL). Acetone (10 mL) was added to the solid in the filter funnel affording a heterogeneous solution. The heterogeneous mixture was stirred using a spatula, then the acetone was pulled through the filter using vacuum. Acetone (10 mL) was again added to the solid in the filter. The heterogeneous mixture was stirred using a spatula, then the acetone was pulled through the filter using vacuum. The material was dried under vacuum to provide 2.1 g (58%) desired product as a tan solid:

$^1$H NMR (400 MHz, Chloroform-d) δ 8.22 (br s, 4H), 7.47-7.30 (m, 4H), 7.26 (d, J=2.5 Hz, 2H), 7.22 (d, J=2.4 Hz, 2H), 7.11-6.86 (m, 6H), 6.72 (br s, 2H), 5.78-5.19 (m, 4H), 3.80-3.44 (m, 4H), 1.66 (s, 4H), 1.45 (s, 36H), 1.30 (s, 12H), 1.24-1.11 (m, 20H), 0.87 (d, J=7.4 Hz, 12H), 0.76 (s, 18H).

Synthesis of (MLC-1)

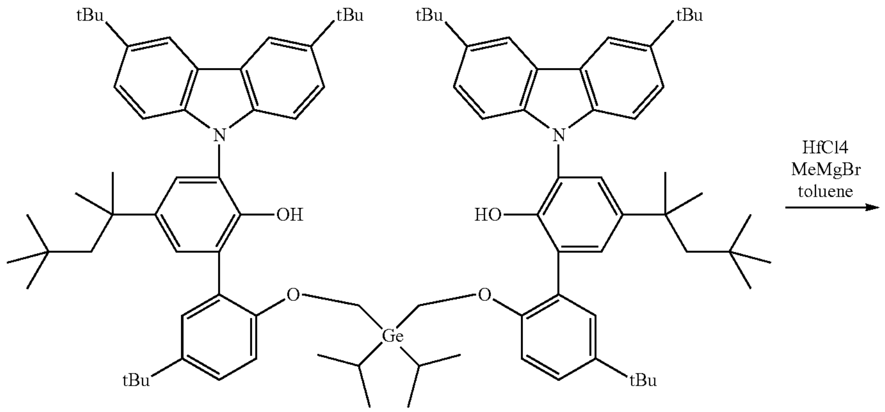

-continued

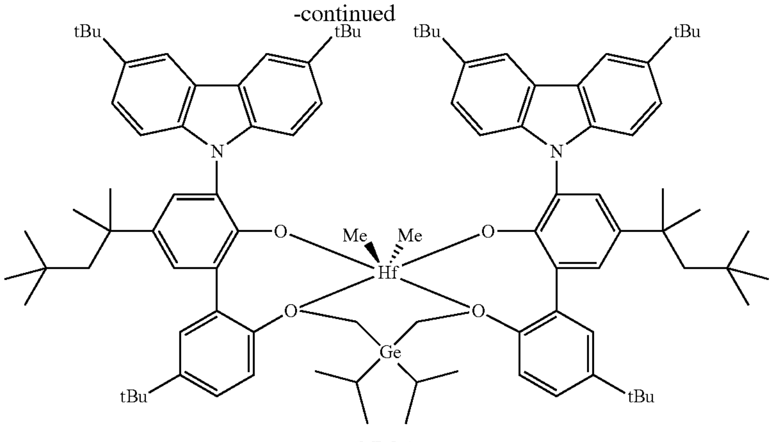

MLC-1

3M MeMgBr in $Et_2O$ (1.96 mL) was added to a −30° C. mixture of tetrachlorohafnium (0.46 g, 1.43 mmol) in toluene (30 mL). After stirring for 3 minutes the solid 2-[5-tert-butyl-2-[[[4-tert-butyl-2-[3-(3,6-ditert-butylcarbazol-9-yl)-2-hydroxy-5-(1,1,3,3-tetramethylbutyl)phenyl]phenoxy] methyl-diisopropyl-germyl]methoxy]phenyl]-6-(3,6-ditert-butylcarbazol-9-yl)-4-(1,1,3,3-tetramethylbutyl)phenol (2.05 g, 1.42 mmol) was added.

After 18 h additional 3M MeMgBr in $Et_2O$ (200 uL) was added, and the reaction was stirred for 1 hour. After this time the solvent was removed under reduced pressure to provide a dark solid.

Hexanes/toluene (2:1, 30 mL) was added to the jar, the solution was stirred for 5 minutes at room temperature, then this material was passed through a fritted funnel CELITE plug. The frit was extracted with hexanes/toluene (2:1 15 mL). The combined organics were dried under vacuum to provide IMLC-1 (2.10 g, yield: 89%) as an off-white solid: $^1H$ NMR (400 MHz, Benzene-d6) δ 8.71 (t, J=1.3 Hz, 2H), 8.37 (dd, J=2.0, 0.7 Hz, 2H), 7.70-7.62 (m, 6H), 7.53 (dd, J=7.4, 2.5 Hz, 4H), 7.47 (dd, J=8.7, 0.6 Hz, 2H), 7.30 (dd, J=8.7, 1.9 Hz, 2H), 7.19-7.11 (m, 2H), 5.29 (d, J=8.7 Hz, 2H), 4.52 (d, J=12.2 Hz, 2H), 3.52 (d, J=12.2 Hz, 2H), 1.81 (d, J=14.5 Hz, 2H), 1.64 (d, J=14.5 Hz, 2H), 1.58 (s, 18H), 1.42 (s, 6H), 1.36 (s, 6H), 1.30 (s, 18H), 1.22 (s, 18H), 0.93 (s, 18H), 0.74-0.61 (m, 8H), 0.59 (d, J=6.6 Hz, 6H), −1.20 (s, 6H).

Synthesis of Metal-Ligand Complex 2 (MLC-2)

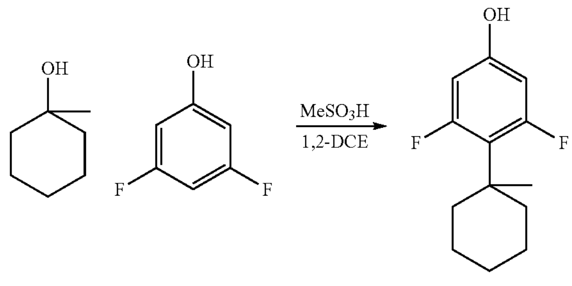

In a glovebox, a 40 mL vial equipped with a stir bar was charged with 3,5-difluorophenol (1.58 g, 12.2 mmol, 1.0 eq), concentrated $MeSO_3H$ (0.79 mL, 12.2 mmol, 1.0 eq) and 1,2-dichloroethane (1.2 mL). The resulting mixture was stirred at ambient temperature until the 3,5-difluorophenol was fully dissolved and was then cooled in an ice-bath before 1-methylcyclohexanol (1.51 mL, 12.2 mmol, 1.0 eq) was added dropwise over 20 minutes. The resulting reaction mixture was stirred for 1 hour at 0° C. and for 16 hours at room temperature before being cooled back to 0° C. and adding additional 1-methylcyclohexanol (0.5 mL) over 5 minutes. After the resulting mixture was stirred at 0° C. for 10 minutes, the vial was removed from the cold bath and stirred at room temperature for 4 hours before being diluted with $Et_2O$ (15 mL) and neutralized with aqueous 1N NaOH. The resulting mixture was then transferred to a separatory funnel, $Et_2O$ was added (10 mL), the layers were separated, and the aqueous phase was further extracted with $Et_2O$ (10 mL). The combined organics were washed with brine (10 mL), dried over $Na_2SO_4$, filtered, and concentrated to dryness. $Et_2O$ (10 mL) was added to the concentrate, then Celite® was added to the organic phase. The solvent was removed under reduced pressure and the resulting solid material was directly loaded onto a pre-column and purified using flash column chromatography (40 g $SiO_2$, 40 mL/min, 0% EtOAc to 10% EtOAc/hexanes over 18 min), which produced 3,5-difluoro-4-(1-methylcyclohexyl)phenol (1.00 g, yield: 35%) as a white solid:

$^1H$ NMR (400 MHz, $CDCl_3$) δ 6.37-6.27 (m, 2H), 5.01 (s, 1H), 2.47-2.35 (m, 2H), 1.67-1.30 (m, 8H), 1.29 (s, 3H).

$^{19}F\{1H\}$ NMR (376 MHz, CDCl3) δ−104.67.

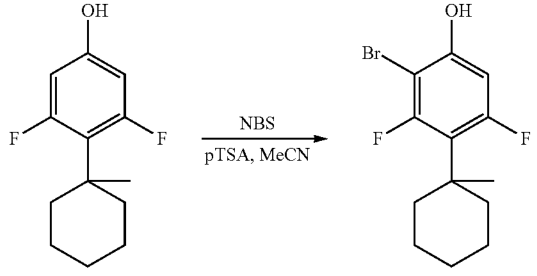

NBS (0.787 g, 4.42 mmol, 1.0 eq) was slowly added to a 0° C. solution of the 3,5-difluoro-4-(1-methylcyclohexyl) phenol (1.00 g, 4.42 mmol, 1.0 eq) and 4-methylbenzene-sulfonic acid-hydrate (0.841 g, 4.42 mmol, 1.0 eq) in acetonitrile (10 mL). The resulting mixture was stirred for 3 days. The solvent was removed under reduced pressure, then the resulting residue was purified directly using flash chromatography (12 g load cartridge, 40 g $SiO_2$, 40 mL/min, 0% ethyl acetate to 10% ethyl acetate/hexanes over 17 min), which produced 2-bromo-3,5-difluoro-4-(1-methylcyclohexyl)phenol (1.00 g, yield: 74%) as a slightly yellow oil:

$^1H$ NMR (400 MHz, $CDCl_3$) δ 6.57 (dd, J=14.3, 2.3 Hz, 1H), 5.60 (d, J=1.3 Hz, 1H), 2.42 (dt, J=13.3, 3.4 Hz, 2H), 1.62 (ddt, J=9.1, 6.2, 3.2 Hz, 2H), 1.55-1.26 (m, 9H).

$^{19}F\{1H\}$NMR (376 MHz, $CDCl_3$) δ−97.78 (d, J=6.2 Hz), −105.01 (d, J=6.2 Hz).

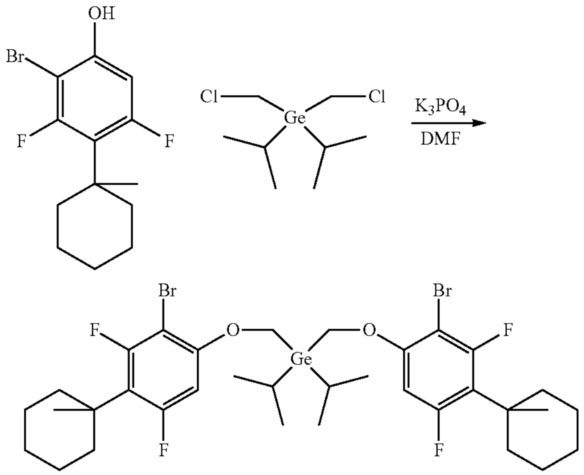

In a glovebox, a 40 mL vial was charged with a germanium-containing bridge (described in International Publication No. WO 2018/183056 A1; 0.385 g, 1.50 mmol, 0.48 eq), phenol (0.95 g, 3.11 mmol, 1.0 eq), $K_3PO_4$ (1.98 g, 9.34 mmol, 3.0 eq), and DMF (3 mL). The resulting mixture was stirred at 80° C. overnight. After cooling down to room temperature, the reaction mixture was purified by column chromatography, which provided bis((2-bromo-3,5-difluoro-4-(1-methylcyclohexyl)phenoxy)methyl)diisopropylgermane (1.24 g, yield: 68%) as a colorless oil:

$^1H$ NMR (400 MHz, $CDCl_3$) δ 6.60 (dd, J=15.1, 2.0 Hz, 2H), 4.12 (s, 4H), 2.43 (dd, J=13.3, 6.0 Hz, 4H), 1.70 (p, J=7.4 Hz, 2H), 1.60 (ddq, J=12.7, 6.8, 3.1 Hz, 4H), 1.53-1.16 (m, 32H).

$^{19}F$ NMR (376 MHz, $CDCl_3$) δ−97.35 (d, J=5.9 Hz, 2F), −104.75 (d, J=6.4 Hz, 2F).

-continued

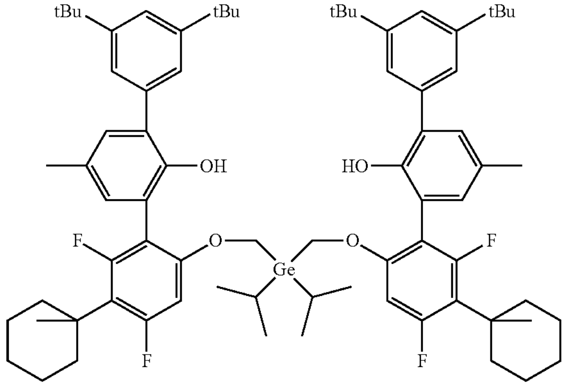

In a glove box, a 40 mL vial was charged with 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (1.256 g, 2.48 mmol, 3.0 eq), bis((2-bromo-3,5-difluoro-4-(1-methylcyclohexyl)phenoxy)methyl) diisopropylgermane (0.657 g, 0.83 mmol, 1.0 eq), $tBu_3P$ Pd G2 (0.066 g, 0.08 mmol, 0.08 eq), toluene (4 mL), and KOH solution (4M, 0.83 mL, 3.30 mmol, 4.0 eq). The vial was heated under nitrogen at 80° C. overnight. When completed, the top organic layer was transferred to another 40 mL vial by rinsing the reaction vial with THF (5 mL). MeOH (10 mL) and concentrated HCl (1 mL) were then added. The resulting mixture was stirred at 85° C. for 2 hours. After cooling down to room temperature, the reaction mixture was filtered through a short plug of silica gel (rinsed with ether). Solvents were removed under reduced pressure and the residue was purified by reverse phase column chromatography, which provided a ligand (0.24 g, yield: 23%) as a white solid:

$^1H$ NMR (400 MHz, $CDCl_3$) δ 7.41 (q, J=1.8 Hz, 2H), 7.31-7.28 (m, 4H), 7.12-7.08 (m, 2H), 6.90-6.86 (m, 2H), 6.50-6.41 (m, 2H), 5.06 (d, J=6.3 Hz, 2H), 3.77-3.68 (m, 4H), 2.50-2.42 (m, 4H), 2.30 (s, 6H), 1.64-1.56 (m, 4H), 1.43 (s, 6H), 1.40-1.28 (m, 48H), 1.20-1.11 (m, 2H), 0.88-0.78 (m, 12H).

$^{19}F$ NMR (376 MHz, $CDCl_3$) δ−104.34 (dd, J=18.1, 6.5 Hz, 2F), −105.19 (dd, J=15.4, 6.3 Hz, 2F).

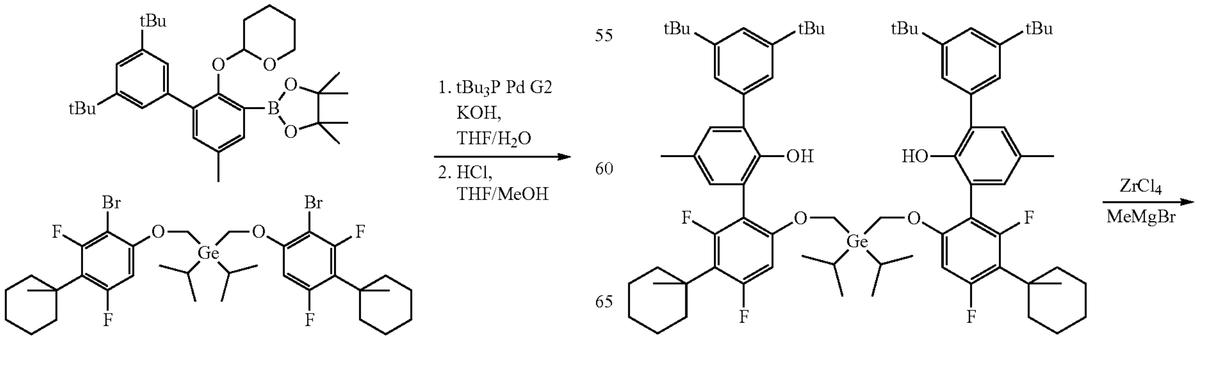

-continued

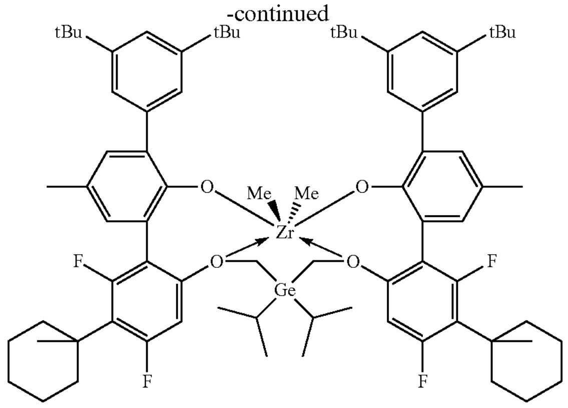

In a glovebox, MeMgBr in diethyl ether (3 M, 0.281 mL, 0.86 mmol, 4.3 eq) was added to a −30° C. suspension of $ZrCl_4$ (0.046 g, 0.2 mmol, 1.0 eq) in anhydrous toluene (6 mL). After stirring for 2 minutes, the solid ligand (0.24 g, 0.2 mmol, 1.0 eq) was added portionwise. The resulting mixture was stirred overnight before the solvent was removed under reduced pressure overnight to afford a dark residue, which was extracted with hexanes (12 mL) and filtered. Any remaining solids were then extracted with toluene (10 mL). The hexane extract was concentrated to approximately 2 mL and placed in a freezer for one day. Any remaining solvent was decanted and the remaining material (98 mg) was dried under vacuum, and combined with the toluene extract (dried under vacuum; 141 mg), which provided a metal-ligand complex (0.239 g, yield: 910%) as a white powder:

$^1$H NMR (400 MHz, $C_6$D6) δ 8.07 (br s, 2H), 7.82 (q, J=1.5 Hz, 2H), 7.54 (br s, 2H), 7.28-7.19 (m, 4H), 5.37 (dd, J=13.4, 1.7 Hz, 2H), 4.72 (d, J=11.5 Hz, 2H), 3.65 (d, J=11.5 Hz, 2H), 2.72-2.55 (m, 4H), 2.19 (s, 6H), 1.69-1.26 (m, 56H), 0.63-0.42 (m, 14H), 0.14 (s, 6H).

$^{19}$F{1H}NMR (376 MHz, $C_6D_6$) δ−101.44 (d, J=5.5 Hz, 2F), −104.43 (d, J=5.7 Hz, 2F).

Synthesis of Metal-Ligand Complex 3 (MLC-3)

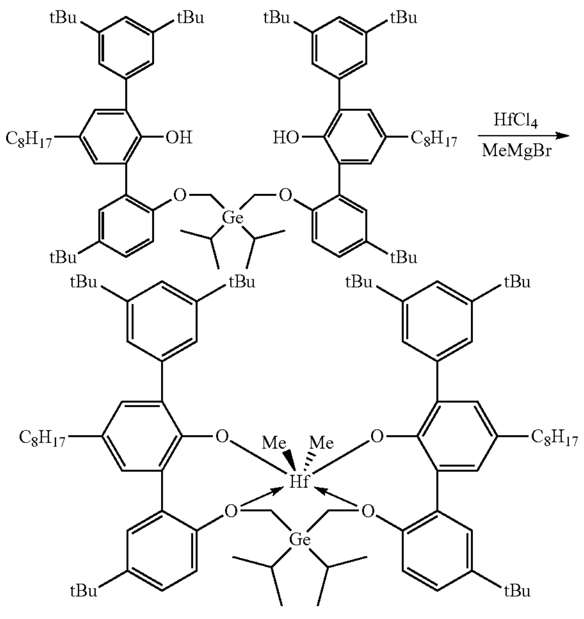

In a glovebox, MeMgBr (methylmagnesium bromide) in diethyl ether (3.0 M, 0.88 mmol, 4.4 eq) was added to a −30° C. suspension of $HfCl_4$ (64 mg, 0.2 mmol, 1.0 eq) in anhydrous toluene (6.0 mL). After stirring the resulting mixture for 2 minutes, the ligand (described in International Publication No. WO 2018/183056 A1; 0.254 g, 0.2 mmol, 1.0 eq) was added portionwise. The resulting mixture was stirred overnight before the solvent was removed under vacuum to afford a dark residue, which was extracted with hexanes (12 mL) followed by toluene (12 mL). The hexane extract was concentrated to approximately 3-4 mL and then kept in a freezer for one day before the top solution was decanted and the white solid was dried under vacuum yielding a white solid (150 mg). The toluene extract was dried under vacuum to afford a white solid (60 mg). The hexane extract and the toluene extract were then combined, which provided a metal-ligand complex (210 mg, yield: 710%) as a white powder:

1H NMR (400 MHz, C6D6) δ 8.14 (br s, 2H), 7.80 (t, J=1.8 Hz, 2H), 7.65 (br s, 2H), 7.58 (d, J=2.5 Hz, 2H), 7.42-7.29 (m, 4H), 7.22 (dd, J=8.6, 2.5 Hz, 2H), 5.71 (d, J=8.6 Hz, 2H), 4.97 (d, J=11.8 Hz, 2H), 3.78 (d, J=11.8 Hz, 2H), 2.74-2.53 (m, 4H), 1.75-1.61 (m, 4H), 1.59-1.20 (m, 74H), 0.94-0.88 (m, 6H), 0.82-0.78 (m, 2H), 0.70-0.60 (m, 12H), −0.23 (s, 6H).

Synthesis of Metal-Ligand Complex 4 (MLC-4)

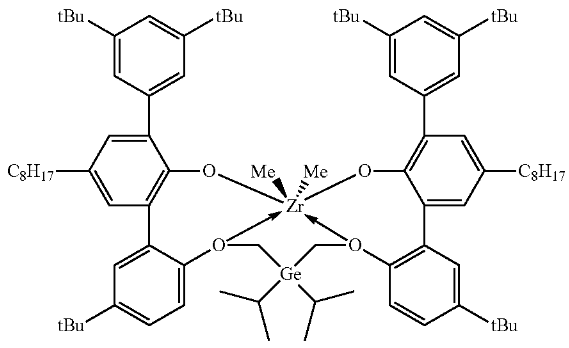

The metal-ligand complex was prepared in the manner described in International Publication No. WO 2018/183056 A1:

$^1$H NMR (400 MHz, $C_6$D6) δ 8.04 (br s, 2H), 7.76 (t, J=1.9 Hz, 2H), 7.61 (br s, 2H), 7.43 (t, J=2.8 Hz, 2H), 7.34 (d, J=2.4 Hz, 2H), 7.08 (t, J=8.8 Hz, 2H), 5.50 (dd, J=8.8, 1.1 Hz, 2H), 4.75 (d, J=11.5 Hz, 2H), 3.69 (d, J=11.4 Hz, 2H), 2.69-2.49 (m, 4H), 1.71-1.60 (m, 4H), 1.58-1.19 (m, 74H), 0.96-0.87 (m, 6H), 0.73-0.57 (m, 14H), −0.04 (s, 6H). $^{19}$F{1H}NMR (376 MHz, $C_6$D6) δ−108.63 (m, 2F).

Synthesis of Metal-Ligand Complex 5 (MLC-5)

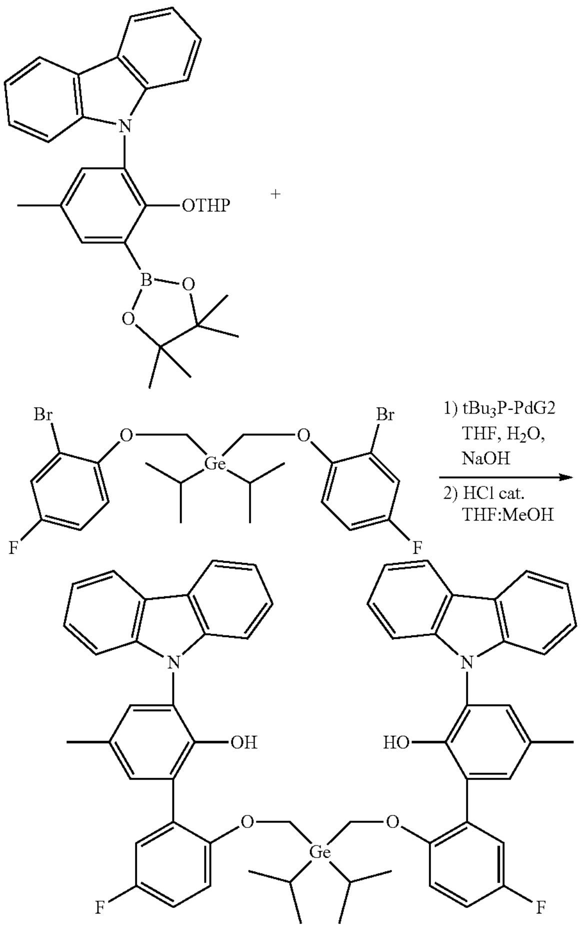

Degassed THF (3 mL) and degassed water (1 mL) were added to a 40 mL vial charged with 9-[5-methyl-2-tetrahydropyran-2-yloxy-3-(4,4,5,5-tetramethyl-1,3,2-dioxaborolan-2-yl)phenyl]carbazole (as described in International Publication No. WO 2016/003879 A1; 0.72 g, 1.49 mmol), bis[(2-bromo-4-fluoro-phenoxy)methyl]-diisopropyl-germane (0.36 g, 0.64 mmol), $tBu_3P$-PdG2 (0.013 g, 0.03 mmol), and NaOH (0.13 g, 3.18 mmol). The resulting mixture was warmed to 50° C. and maintained at this temperature for 18 hours. After this time, the reaction was cooled to room temperature. $Et_2O$ (10 mL) and brine (3 mL) were added to the mixture. The resulting solution was shaken and, after the layers settled, the organic phase was removed using a pipet, and transferred to a 40 mL vial. MeOH (6 mL) was added followed by concentrated HCl (5 drops from a glass pipet). The resulting solution was stirred at room temperature for 3 hours before the solvent was removed under reduced pressure.

The resulting yellow oil was rotovapped from $CH_3CN$ (3×3 mL), and a tan solid formed. $CH_3CN$ (6 mL) was added to the solid, which was then collected by filtration. The solid was washed with $CH_3CN$ (2×3 mL). The material was dissolved in $Et_2O$ (4 mL) and passed through a plug of silica. The plug was washed with additional $Et_2O$ (20 mL). The combined $Et_2O$ was concentrated to dryness to provide 2-carbazol-9-yl-6-[2-[[[2-(3-carbazol-9-yl-2-hydroxy-5-methyl-phenyl)-4-fluoro-phenoxy]methyl-diisopropyl-germyl]methoxy]-5-fluoro-phenyl]-4-methyl-phenol (0.430 g, yield: 71%) as a white solid:

$^1H$ NMR (400 MHz, Chloroform-d) δ 8.20 (ddd, J=7.7, 1.3, 0.7 Hz, 4H), 7.34 (ddd, J=8.1, 7.2, 1.4 Hz, 4H), 7.29 (td, J=7.4, 1.2 Hz, 4H), 7.18 (d, J=2.2 Hz, 2H), 7.14-7.10 (m, 4H), 7.04 (dd, J=2.2, 0.7 Hz, 2H), 6.92 (dd, J=8.8, 3.1 Hz, 2H), 6.50-6.36 (m, 2H), 5.95-5.81 (m, 2H), 5.49 (s, 2H), 3.60 (s, 4H), 2.31 (s, 6H), 1.13 (h, J=7.3 Hz, 2H), 0.81 (d, J=7.5 Hz, 12H).

$^{19}F$ NMR (376 MHz, CDCl3) δ−123.49.

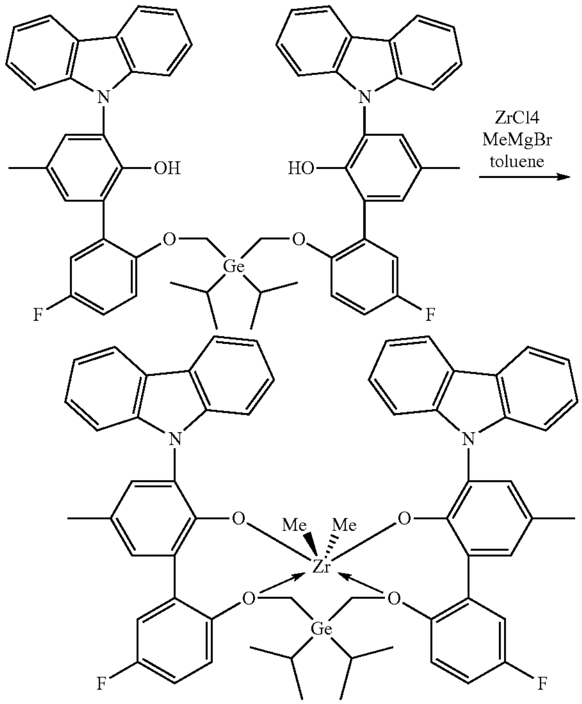

IMLC-5

In a glovebox, MeMgBr in diethyl ether (3 M, 0.37 mL) was added to a −30° C. suspension of $ZrCl_4$ (0.06 g, 0.27 mmol) in anhydrous toluene (5 mL). After stirring the resulting mixture for 3 minutes, the 2-carbazol-9-yl-6-[2-[[[2-(3-carbazol-9-yl-2-hydroxy-5-methyl-phenyl)-4-fluoro-phenoxy]methyl-diisopropyl-germyl]methoxy]-5-fluoro-phenyl]-4-methyl-phenol (0.25 g, 0.26 mmol) was added as a solution in toluene/$CH_2Cl_2$ (2:1, 3 mL). The resulting mixture was stirred for four hours before the solvent was removed under vacuum to afford a dark residue. Hexanes (4 mL) was added to the dark residue, then this mixture was passed through a CELITE pad. The residue was washed with additional hexanes (4 mL). A new collection vial was put on, and the residue was then extracted with toluene (3×8 mL). The combined toluene extracts were concentrated to dryness to provide a tan semi-solid. The solid was evaporated from pentane (3×2 mL) to provide a metal-ligand complex (0.150 g, yield: 53%) as a tan solid:

$^1H$ NMR (400 MHz, Benzene-d6) δ 8.12 (dt, J=7.7, 0.9 Hz, 2H), 8.03 (dt, J=7.7, 1.0 Hz, 2H), 7.48 (dq, J=8.3, 1.0 Hz, 4H), 7.36 (ddd, J=8.2, 7.1, 1.3 Hz, 2H), 7.25 (ddd, J=8.4, 7.2, 1.2 Hz, 4H), 7.20-7.11 (m, 2H), 7.03 (dd, J=2.4, 0.8 Hz, 2H), 6.88-6.80 (m, 4H), 6.66 (ddd, J=9.0, 7.3, 3.2 Hz, 2H), 4.91 (dd, J=9.0, 4.8 Hz, 2H), 4.30 (d, J=12.1 Hz, 2H), 3.26

(d, J=12.1 Hz, 2H), 2.07 (s, 6H), 1.31-1.15 (m, 1H), 0.61-0.48 (m, 14H), −0.93 (s, 6H).

$^{19}$F NMR (376 MHz, C6D6) δ−117.32.

Synthesis of Metal-Ligand Complex 6 (MLC-6)

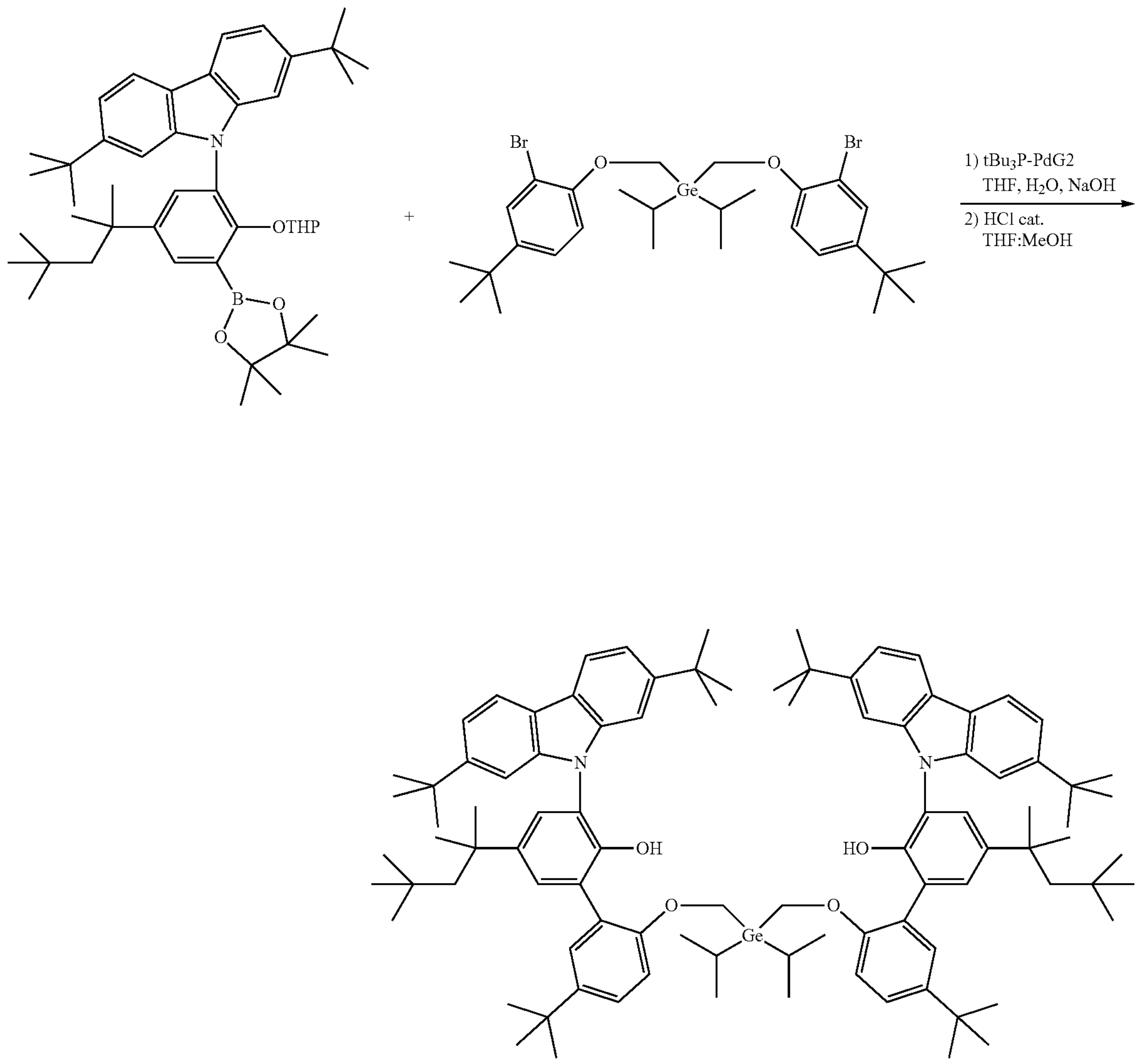

Degassed toluene (6 ml) and degassed water (3 mL) were added to a 40 mL vial charged with 2,7-ditert-butyl-9-[2-tetrahydropyran-2-yloxy-5-(1,1,3,3-tetramethylbutyl)-3-(4,4,5,5-tetramethyl-1,3,2-dioxaborolan-2-yl)phenyl]carbazole (1.62 g, 2.33 mmol), bis[(2-bromo-4-tert-butyl-phenoxy)methyl]-diisopropyl-germane (as described in International Publication No. WO 2018/183056 A1; 0.6 g, 0.93 mmol), $tBu_3P$-PdG2 (0.02 g, 0.04 mmol), and NaOH (0.19 g, 4.67 mmol). The resulting mixture was warmed to 75° C. and maintained at this temperature for 18 hours. After this time, the reaction was cooled to room temperature. The mixture was transferred to a separatory funnel, $Et_2O$ (20 mL) and $H_2O$ (10 mL) were added, and the layers were separated. The aqueous phase was extracted with additional $Et_2O$ (10 mL). The combined organics were washed with brine (10 mL), dried ($Na_2SO_4$), and filtered into a 100 mL roundbottom flask. The solvent was removed under reduced pressure. The crude residue was dissolved in MeOH/THF (1:1, 20 mL), concentrated HCl (5 drops from a glass pipet) was added, a reflux condenser was fitted to the flask, then the solution was warmed to 70° C. while stirring. After 4 hours, the solvent was removed under reduced pressure. The yellow oil was rotovapped from $CH_3CN$ (3×5 mL), and a tan solid formed. $CH_3CN$ (15 mL) was added to the solid, which was then collected by filtration. The solid was washed with $CH_3CN$ (2×4 mL). The solid was isolated and dried under vacuum to produce 6',6'''-(((diisopropylgermanediyl)bis(methylene))bis(oxy))bis(3'-(tert-butyl)-3-(2,7-di-tert-butyl-9H-carbazol-9-yl)-5-(2,4,4-trimethylpentan-2-yl)-[1,1'-biphenyl]-2-ol) (0.7 g, yield: 52%) as a tan powder:

$^1$H NMR (400 MHz, Chloroform-d) δ 8.05 (d, J=8.2 Hz, 4H), 7.35-7.29 (m, 6H), 7.24 (d, J=2.5 Hz, 2H), 7.21-7.10 (m, 6H), 6.71 (d, J=8.6 Hz, 2H), 6.25 (d, J=7.2 Hz, 2H), 5.35 (s, 2H), 3.78 (s, 4H), 1.67 (s, 4H), 1.33 (s, 12H), 1.30 (s, 36H), 1.23-1.12 (m, 20H), 0.79 (d, J=7.4 Hz, 12H), 0.77 (s, 18H).

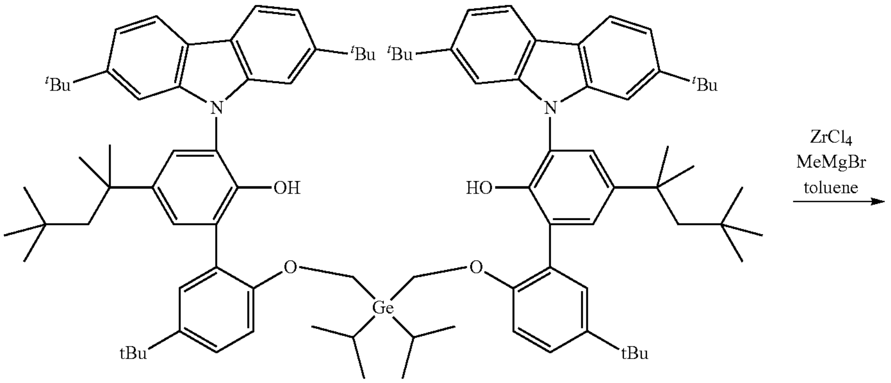

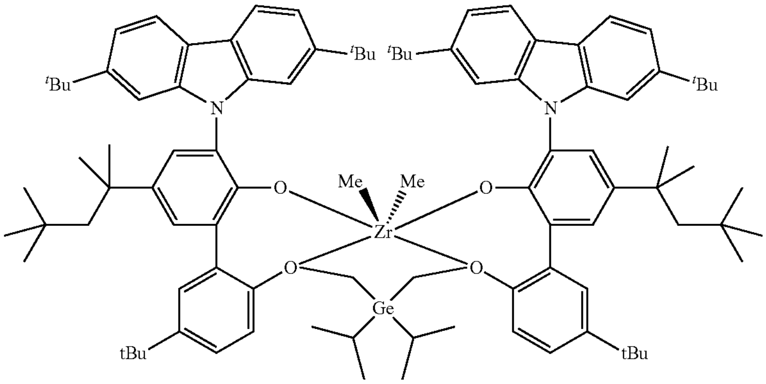

IMLC-6

In a glovebox, MeMgBr in diethyl ether (3 M, 0.30 mL) was added to a −30° C. suspension of $ZrCl_4$ (0.05 g, 0.22 mmol) in anhydrous toluene (8 mL). After stirring the resulting mixture for 3 minutes, a −30° C. solution of the 6',6'''-(((diisopropylgermanediyl)bis(methylene))bis(oxy)) bis(3'-(tert-butyl)-3-(2,7-di-tert-butyl-9H-carbazol-9-yl)-5-(2,4,4-trimethylpentan-2-yl)-[1,1'-biphenyl]-2-ol) (0.3 g, 0.21 mmol) in toluene (2 mL) was added. The resulting mixture was stirred for 2 hours before the solvent was removed under vacuum to afford a dark residue. Hexanes (10 mL) was added to the vial, the solution was shaken for a few minutes at room temperature, then this material was passed through a fritted funnel CELITE plug. The frit was extracted with hexanes (5 mL), the vial was replaced, and the CELITE plug was extracted with toluene (2×10 mL). The toluene was removed using vacuum to provide a metal-ligand complex (0.18 g, yield: 55%) as a tan powder:

$^1$H NMR (400 MHz, Benzene-d6) δ 8.40 (d, J=8.2 Hz, 2H), 8.09 (dd, J=8.2, 0.6 Hz, 2H), 7.75 (d, J=1.6 Hz, 2H), 7.68-7.63 (m, 4H), 7.61-7.55 (m, 4H), 7.50 (d, J=2.5 Hz, 2H), 7.29 (dd, J=8.3, 1.7 Hz, 2H), 7.09 (dd, J=8.7, 2.6 Hz, 2H), 5.19 (d, J=8.6 Hz, 2H), 4.64 (d, J=12.2 Hz, 2H), 3.67 (d, J=12.2 Hz, 2H), 1.79-1.61 (m, 4H), 1.48-1.43 (m, 24H), 1.40 (s, 6H), 1.22 (s, 18H), 1.16 (s, 18H), 0.94 (s, 20H), 0.75 (d, J=7.4 Hz, 6H), 0.64 (d, J=7.5 Hz, 6H), −1.01 (s, 6H).

Synthesis of Metal-Ligand Complex 7 (MLC-7)

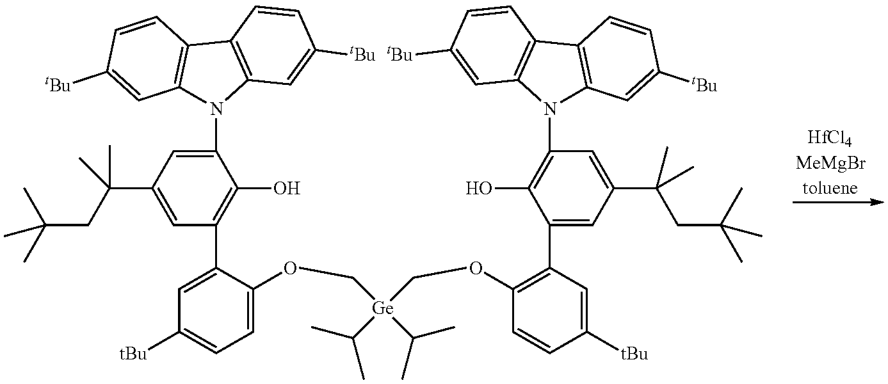

-continued

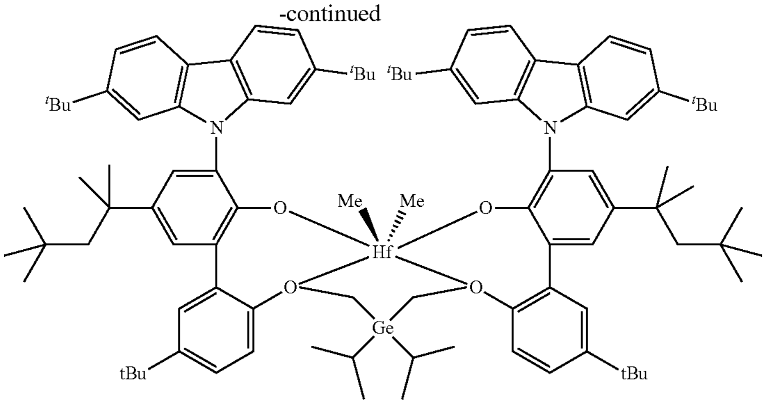

IMLC-7

In a glovebox, MeMgBr in diethyl ether (3 M, 0.30 mL) was added to a −30° C. suspension of $HfCl_4$ (0.07 g, 0.21 mmol) in anhydrous toluene (8 mL). After stirring the resulting mixture for 3 minutes, a −30° C. solution of the 6',6'''-(((diisopropylgermanediyl)bis(methylene))bis(oxy))bis(3'-(tert-butyl)-3-(2,7-di-tert-butyl-9H-carbazol-9-yl)-5-(2,4,4-trimethylpentan-2-yl)-[1,1'-biphenyl]-2-ol) (0.3 g, 0.21 mmol) in toluene (2 mL) was added. The resulting mixture was stirred for 18 hours before the solvent was removed under vacuum to afford a dark residue. Hexanes (5 mL) was added to the vial, the solution was shaken for a few minutes at room temperature, then this material was passed through a fritted funnel CELITE plug. The frit was extracted with hexanes (3 mL), the vial was replaced, and the CELITE plug was extracted with toluene (2×10 mL). The toluene was removed using vacuum to provide a metal-ligand complex (0.14 g, yield: 410%) as a tan powder:

$^1H$ NMR (400 MHz, Benzene-d6) δ 8.41 (d, J=8.4 Hz, 2H), 8.10 (dd, J=8.2, 0.6 Hz, 2H), 7.75 (d, J=1.6 Hz, 2H), 7.66 (d, J=2.5 Hz, 2H), 7.63-7.60 (m, 4H), 7.57 (dd, J=8.3, 1.7 Hz, 2H), 7.49 (d, J=2.5 Hz, 2H), 7.29 (dd, J=8.3, 1.7 Hz, 2H), 7.10 (dd, J=8.2, 2.1 Hz, 2H), 5.19 (d, J=8.7 Hz, 2H), 4.74 (d, J=12.3 Hz, 2H), 3.74 (d, J=12.4 Hz, 2H), 1.78-1.60 (m, 4H), 1.47-1.44 (m, 24H), 1.40 (s, 6H), 1.21 (s, 18H), 1.15 (s, 18H), 0.93 (s, 20H), 0.75 (d, J=7.4 Hz, 6H), 0.63 (d, J=7.5 Hz, 6H), −1.23 (s, 6H).

Synthesis of Metal-Ligand Complex 8 (MLC-8)

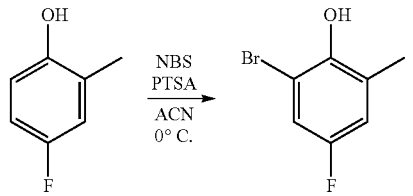

A 1 L glass bottle was charged with acetonitrile (400 mL), 4-fluoro-6-methyl-phenol (50 g, 396.4 mmol), and p-toluenesulfonic acid (monohydrate; 75.6 g, 396 mmol), making sure everything was in solution. The solution was cooled to 0° C. with ice for 25 min, providing a precipitate. The cooled solution was slowly treated with N-bromosuccinimide (70.55 g, 396.4 mmol) over the course of approximately 5 minutes, and was allowed to reach room temperature while stirring overnight. The volatiles were removed under vacuum, and the resulting solid was treated with dichloromethane (600 mL), cooled in the freezer (0° C.), and filtered through a large plug of silica gel. The silica gel was washed several times with cold $CH_2Cl_2$. The volatiles were removed under vacuum to provide 2-bromo-4-fluoro-6-methyl-phenol (46 g, yield: 56%):

$^1H$ NMR (400 MHz, Chloroform-d) δ 7.05 (ddd, J=7.7, 3.0, 0.7 Hz, 1H), 6.83 (ddt, J=8.7, 3.0, 0.8 Hz, 1H), 5.35 (s, 1H), 2.29 (d, J=0.7 Hz, 3H).

$^{19}F$ NMR (376 MHz, Chloroform-d) δ−122.84.

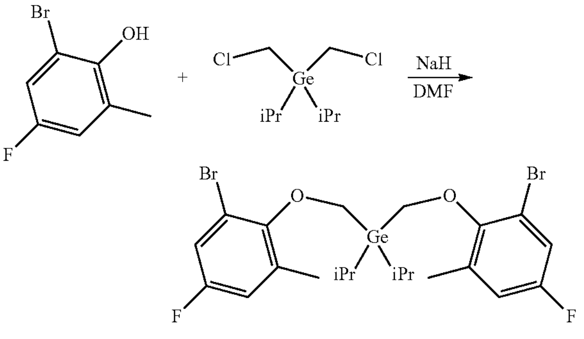

In a glovebox, in a 250 mL flask equipped with a magnetic stir bar, 95% NaH (1.76 g) (Caution $H_2$ is generated) was slowly added to a solution of 2-bromo-4-fluoro-6-methyl-phenol (15 g, 73.2 mmol) in N,N-dimethylformamide (DMF) (35 mL) until hydrogen evolution ceased. This mixture was stirred for 30 minutes at room temperature. After this time, the diisopropyl germyl dichloride (6.29 g, 24.4 mmol) was added. The mixture was warmed to 55° C. and held at this temperature for 18 hours. The reaction was removed from the glove box and quenched with saturated aqueous $NH_4Cl$ (20 mL) and $H_2O$ (8 mL). $Et_2O$ (30 mL) was added and the phases were transferred to a separatory funnel and separated. The aqueous phase was further extracted with $Et_2O$ (20 mL), and the combined organic extracts were washed with brine (10 mL). The organic layer was then dried ($MgSO_4$), filtered, and concentrated to dryness. The crude residue was dry loaded onto silica gel and then purified using flash column chromatography (100 mL/min, pure hexanes with ethyl acetate ramping to 10% over 20 minutes) to afford the product as a pale-yellow oil. All clean fractions (some fractions contained <10% of starting phenol) were combined, and the final product was dried under vacuum overnight, which provided bis((2-bromo-4-fluoro-6-methylphenoxy)methyl)diisopropylgermane (9 g, yield: 62%):

$^1$H NMR (400 MHz, Chloroform-d) δ 7.10 (dd, J=7.7, 3.0 Hz, 2H), 6.84 (ddd, J=8.8, 3.1, 0.8 Hz, 2H), 4.14 (s, 4H), 2.33 (s, 6H), 1.74 (hept, J=7.4 Hz, 2H), 1.35 (d, J=7.4 Hz, 12H).

$^{19}$F NMR (376 MHz, Chloroform-d) δ−118.03.

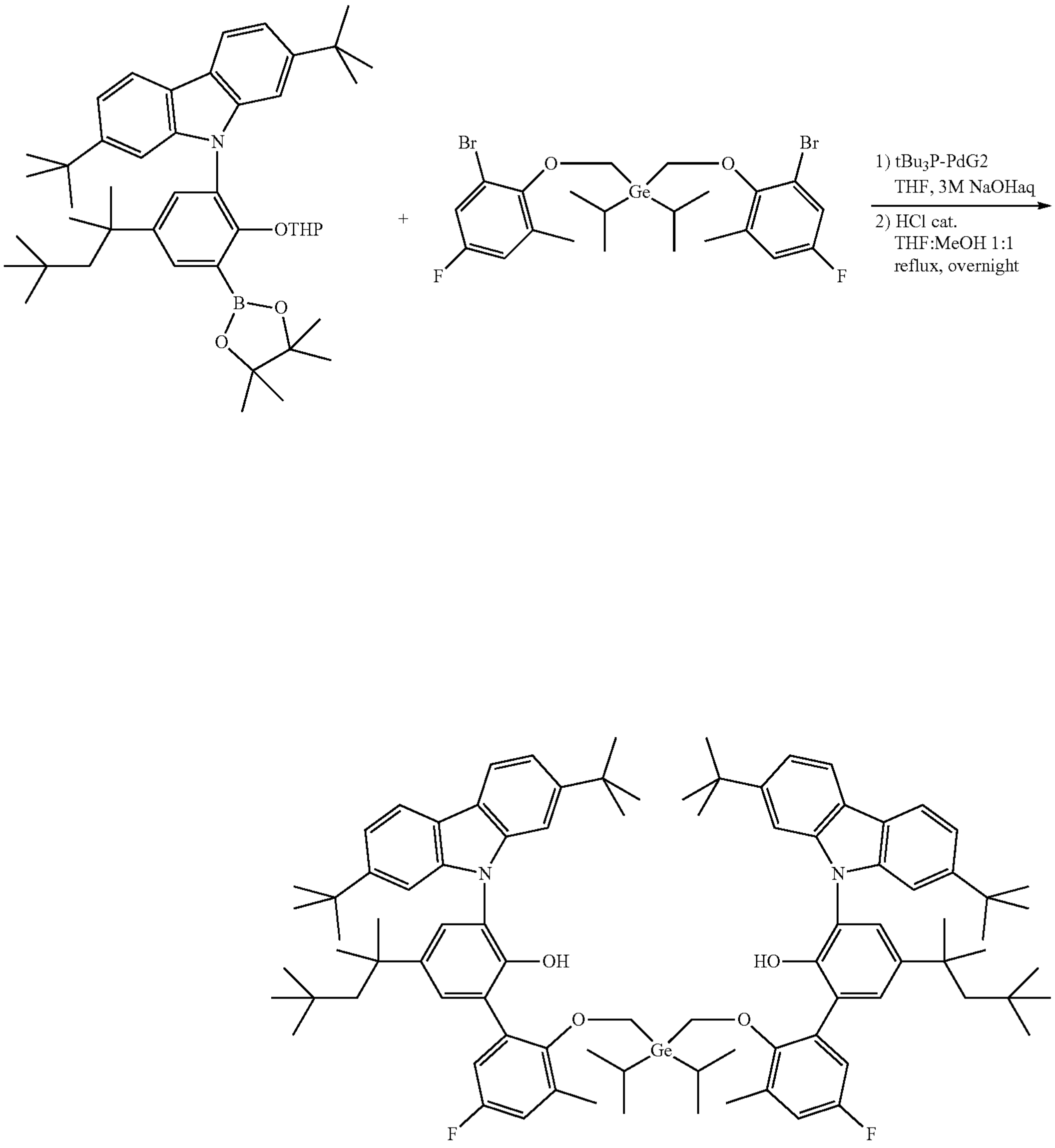

A 500 mL glass-bottle, equipped with a stir bar, was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (as described in International Publication No. WO 2014/105411 A1; 29.0 g, 41.9 mmol), bis((2-bromo-4-fluoro-6-methylphenoxy)methyl)diisopropylgermane (6.00 g, 8.65 mmol, contains 10% 2-bromo-4-fluoro-2-methyl-phenol), and THF (80 mL). The solution was heated to 55° C. and, while stirring, was treated with chloro[(tri-tert-butylphosphine)-2-(2-aminobiphenyl)]palladium (II) ($tBu_3P$-PdG2) (199 mg, 0.346 mmol, 4 mol %). An aqueous solution of NaOH (17.3 mL, 51.9 mmol, 3M) was purged with nitrogen for 20 min, and then added to the THF solution. The reaction was stirred overnight at 55° C. The aqueous phase was separated and discarded, and the remaining organic phase was diluted with diethyl ether and washed with brine twice. The solution was passed through a short plug of silica gel. The filtrate was dried on a rotary evaporator, dissolved in THF/methanol (40 mL/40 mL), treated with HCl (2 mL), and stirred overnight at 70° C. The solution was dried under vacuum, and purified by $C_{18}$ reverse-phase column chromatography to provide a ligand (6.5 g, yield: 54%) as an off-white solid:

$^1$H NMR (400 MHz, Chloroform-d) δ 8.01 (d, J=8.2 Hz, 4H), 7.42 (dd, J=25.5, 2.4 Hz, 4H), 7.32 (dd, J=8.2, 1.6 Hz, 4H), 7.17 (s, 4H), 6.87 (ddd, J=16.4, 8.8, 3.0 Hz, 4H), 6.18 (s, 2H), 3.79 (s, 4H), 2.12 (s, 6H), 1.71 (s, 6H), 1.56 (s, 4H), 1.38 (s, 12H), 1.31 (s, 36H), 0.83-0.73 (m, 30H).

$^{19}$F NMR (376 MHz, Chloroform-d) δ−119.02.

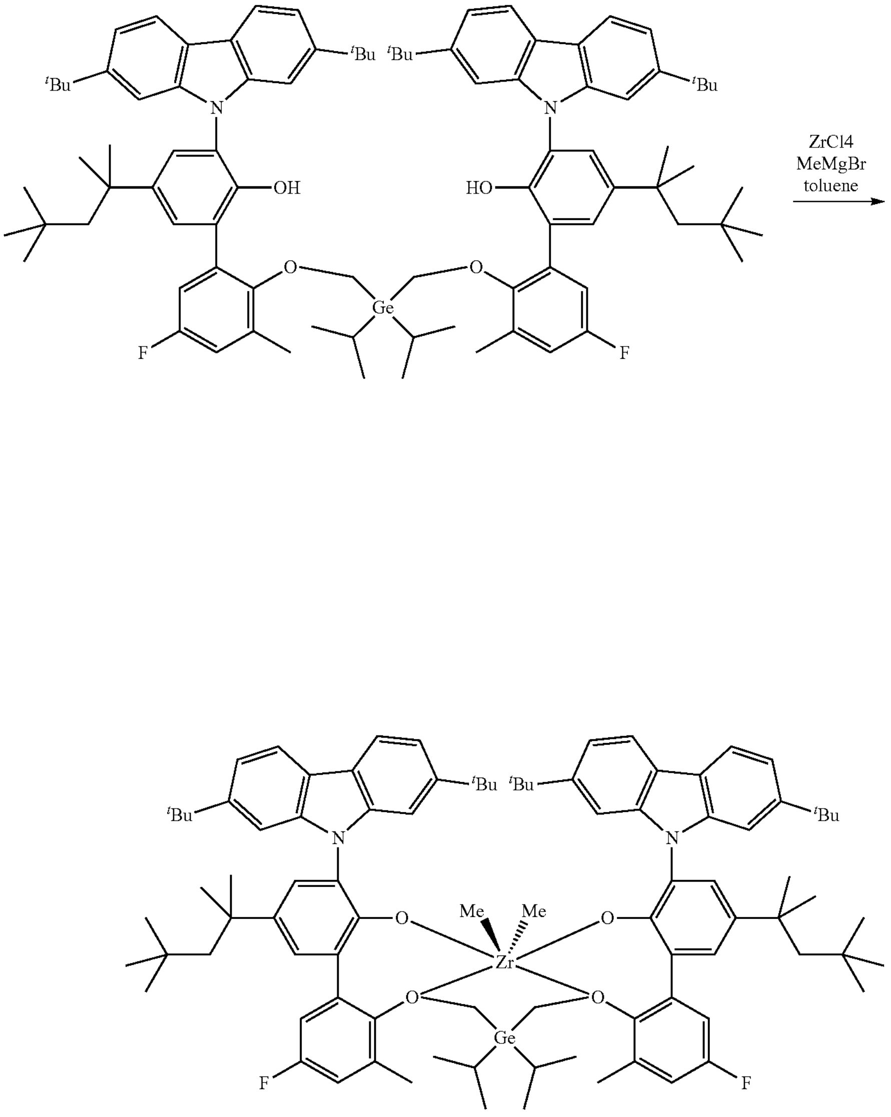

IMLC-8

In a glovebox, MeMgBr in diethyl ether (3M, 2.4 mL, 7.1 mmol) was added to a -30° C. suspension of $ZrCl_4$ (402 mg, 1.72 mmol) in anhydrous toluene (83 mL). After stirring the resulting mixture for 3 minutes, the ligand (2.3 g, 1.64 mmol) was added portion wise. The reaction was stirred overnight at room temperature, and then filtered through a fritted plastic funnel. The filtrate was dried under vacuum, re-dissolved in toluene (40 mL), filtered again through a plug of CELITE, and dried again under vacuum. The resulting solid was washed with pentane (approximately 5 mL) and dried under vacuum, which provided a metal-ligand complex (2.1 g, yield: 84%) as an off-white powder:

$^{1}H$ NMR (400 MHz, Benzene-$d_6$) δ 8.20 (dd, J=8.2, 0.5 Hz, 2H), 8.11 (dd, J=8.2, 0.6 Hz, 2H), 7.88-7.82 (m, 4H), 7.77 (d, J=2.6 Hz, 2H), 7.50 (dd, J=8.3, 1.7 Hz, 2H), 7.42-7.37 (m, 4H), 6.99 (dd, J=8.7, 3.1 Hz, 2H), 6.20-6.10 (m, 2H), 4.29 (d, J=12.2 Hz, 2H), 3.90 (d, J=12.2 Hz, 2H), 1.56 (s, 4H), 1.53 (s, 18H), 1.29 (s, 24H), 1.27 (s, 6H), 1.18 (s, 6H), 1.04-0.94 (m, 2H), 0.81 (d, J=7.4 Hz, 6H), 0.80 (s, 18H), 0.74 (d, J=7.4 Hz, 6H), -0.47 (s, 6H).

$^{19}F$ NMR (376 MHz, Benzene-d6) δ-116.24.

Production of Catalyst Systems

Various catalyst systems were produced via spray drying. Specifically, fumed silica (commercially available as CAB-O-SIL® from Cabot Corporation) and methylaluminoxane (10 wt. % in toluene) were dissolved in toluene and mixed for 15 minutes. A metal-ligand complex was added to the resulting slurry and mixed for an additional 30 to 60 minutes. The resulting catalyst system precursor was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm.

The structures of the different metal-ligand complexes are reported in Table 1. The specific metal-ligand complex, as well as the amounts of each component, used to produce each catalyst system are reported in Table 2.

TABLE 1
| Metal-Ligand Complex | Structure |
|---|---|
| CMLC-1 | 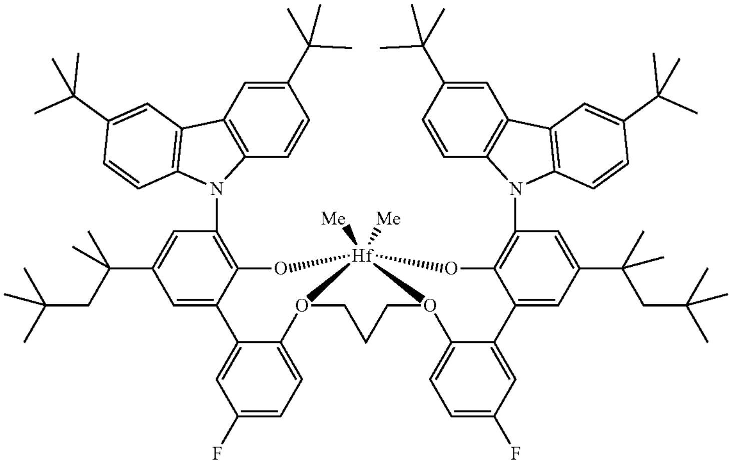 |
| CMLC-2 | 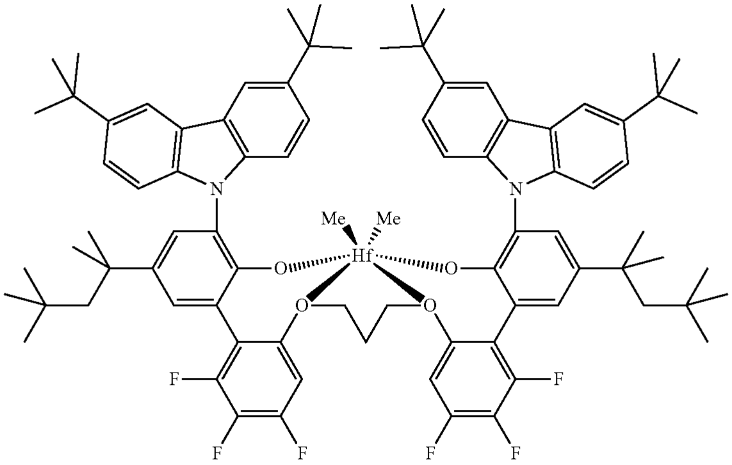 |
| CMLC-3 | 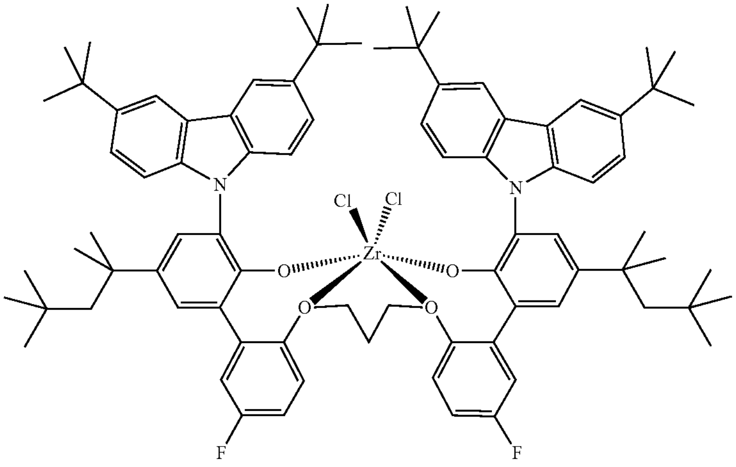 |

TABLE 1-continued
| Metal-Ligand Complex | Structure |
| --- | --- |
| CMLC-4 | 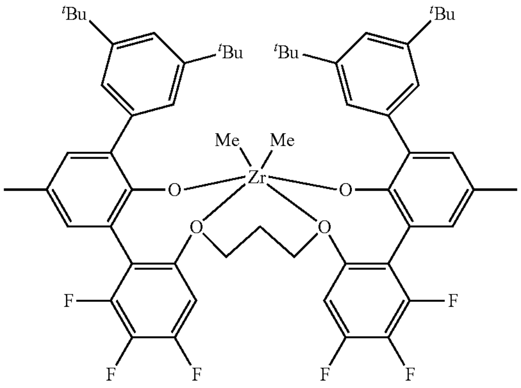 |
| CMLC-5 | 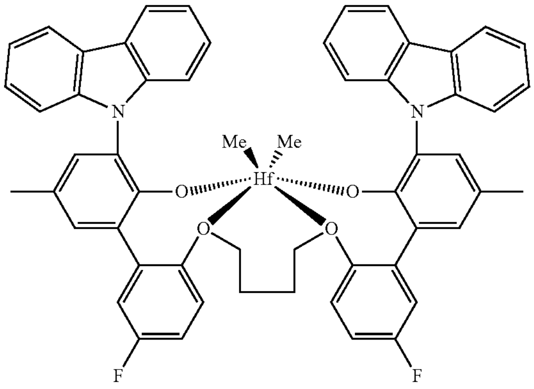 |
| CMLC-6 | 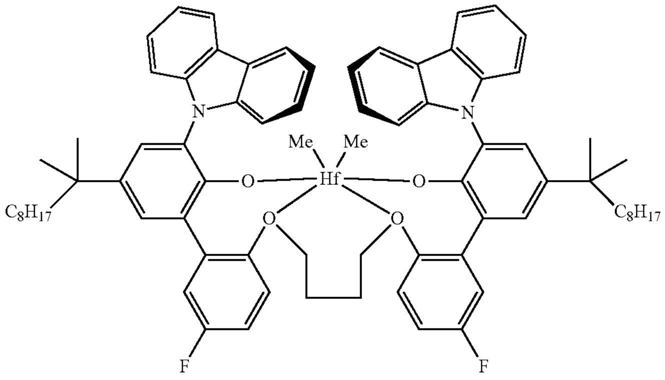 |
| MLC-1 | 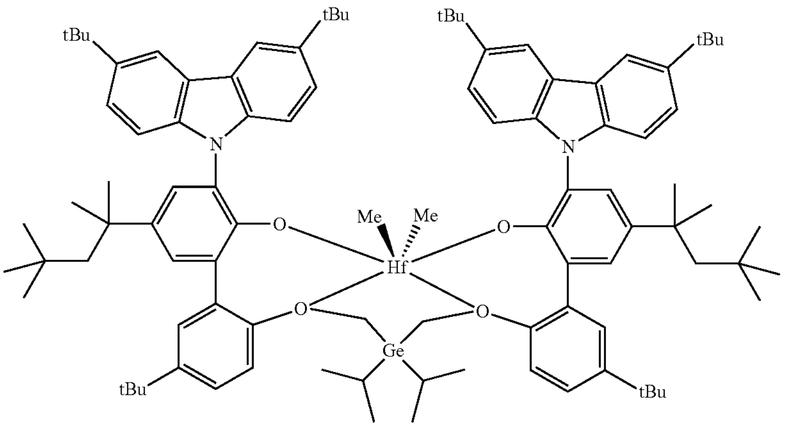 |

TABLE 1-continued
| Metal-Ligand Complex | Structure |
|---|---|
| MLC-2 | 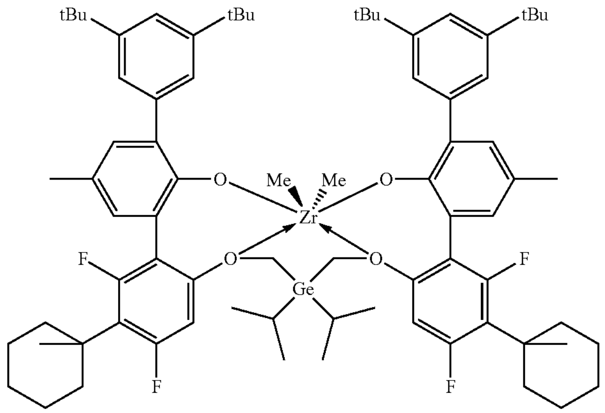 |
| MLC-3 | 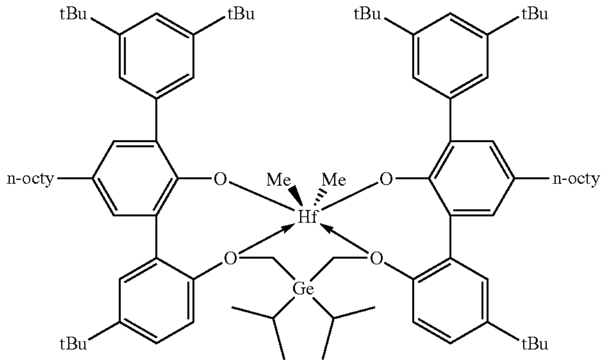 |
| MLC-4 | 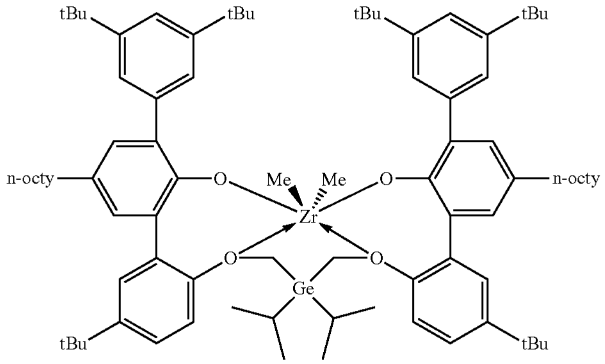 |
| MLC-5 | 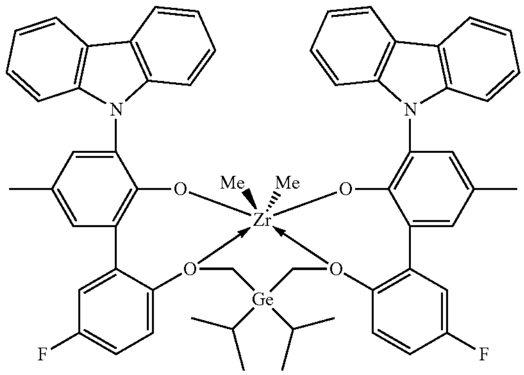 |

TABLE 1-continued

| Metal-Ligand Complex | Structure |
|---|---|
| MLC-6 | 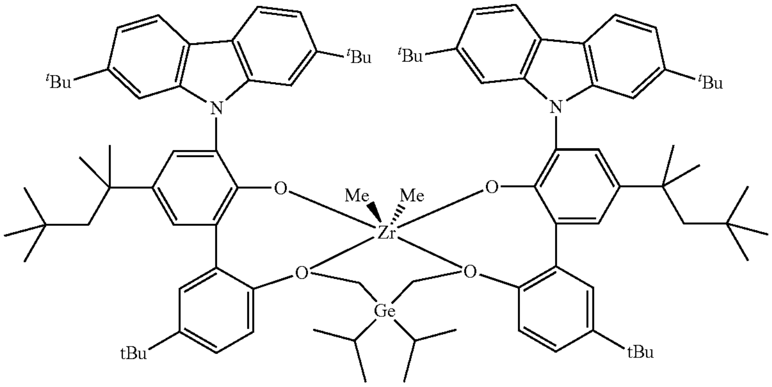 |
| MLC-7 | 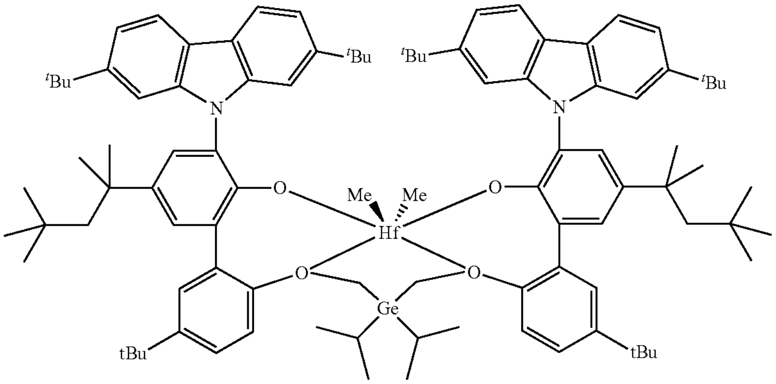 |
| MLC-8 | 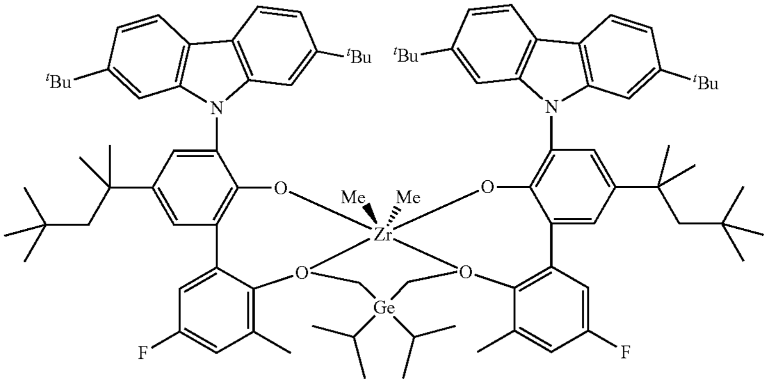 |

TABLE 2

| Catalyst System | Metal-Ligand Complex | Mass of Metal-Ligand Complex (g) | Mass of Fumed Silica (g) | Mass of MAO (g) | Mass of Toluene (g) |
|---|---|---|---|---|---|
| Comparative Sample 1 | CMLC-1 | 0.161 | 1.325 | 11.00 | 37.5 |
| Comparative Sample 2 | CMLC-2 | 0.101 | 0.795 | 6.60 | 22.5 |
| Comparative Sample 3 | CMLC-3 | 0.186 | 1.590 | 13.20 | 45.0 |
| Comparative Sample 4 | CMLC-4 | 0.070 | 0.795 | 6.60 | 22.5 |
| Comparative Sample 5 | CMLC-5 | 0.070 | 1.325 | 11.00 | 37.5 |
| Comparative Sample 6 | CMLC-6 | 0.089 | 1.325 | 11.00 | 37.5 |

TABLE 2-continued

| Catalyst System | Metal-Ligand Complex | Mass of Metal-Ligand Complex (g) | Mass of Fumed Silica (g) | Mass of MAO (g) | Mass of Toluene (g) |
|---|---|---|---|---|---|
| Sample 1 | MLC-1 | 0.083 | 0.750 | 6.50 | 21.0 |
| Sample 2 | MLC-1 | 0.042 | 0.800 | 6.60 | 21.0 |
| Sample 3 | MLC-2 | 0.079 | 0.790 | 6.90 | 22.0 |
| Sample 4 | MLC-2 | 0.038 | 0.800 | 6.60 | 21.0 |
| Sample 5 | MLC-2 | 0.041 | 0.690 | 9.10 | 23.0 |
| Sample 6 | MLC-3 | 0.088 | 0.800 | 6.90 | 22.0 |
| Sample 7 | MLC-4 | 0.740 | 0.660 | 5.90 | 37.5 |
| Sample 8 | MLC-5 | 0.061 | 0.785 | 6.65 | 21.0 |
| Sample 9 | MLC-5 | 0.030 | 0.800 | 6.50 | 21.0 |
| Sample 10 | MLC-6 | 0.045 | 0.800 | 6.60 | 21.0 |
| Sample 11 | MLC-7 | 0.045 | 0.750 | 6.30 | 20.0 |
| Sample 12 | MLC-8 | 0.043 | 0.800 | 6.60 | 20.0 |

TABLE 2-continued

| Catalyst System | Metal-Ligand Complex | Mass of Metal-Ligand Complex (g) | Mass of Fumed Silica (g) | Mass of MAO (g) | Mass of Toluene (g) |
|---|---|---|---|---|---|
| Sample 13 | MLC-8 | 0.091 | 0.800 | 6.98 | 20.0 |
| Sample 14 | MLC-8 | 0.046 | 0.680 | 9.05 | 20.0 |

Various polyethylene samples were produced by contacting ethylene and 1-hexene with the catalyst systems reported in Table 2 in a gas-phase polymerization reactor. Specifically, a gas-phase polymerization reactor (i.e., a 2-liter, stainless steel autoclave equipped with a mechanical agitator) was dried for 1 hour, charged with sodium chloride (200 grams), and dried again at 100° C. under nitrogen for 30 minutes. Supported methylaluminoxane (SMAO; 3 grams) was then introduced to the reactor under nitrogen pressure, the reactor was sealed, and the components were stirred. The reactor was then charged with hydrogen and 1-hexene pressurized with ethylene. Once steady state operation was achieved, a catalyst system was charged into the reactor at 80° C. to initiate polymerization. The reactor was then heated to a desired reaction temperature and maintained for a desired run time. After the run was complete, the reactor was cooled, vented, and opened. The resulting poly(ethylene-co-1-hexene) copolymer was collected, washed with water and methanol, and dried.

The reaction conditions used for each run are reported in Table 3. The reactor data for each run are reported in Table 4. The properties of the poly(ethylene-co-1-hexene) copolymer produced by each run are reported in Table 5.

TABLE 3

| Condition | Temperature (° C.) | $C_6/C_2$ Ratio | $H_2/C_2$ Ratio | $C_2$ Partial Pressure (psi) | Run Time (hours) |
|---|---|---|---|---|---|
| 1 | 90 | 0.016 | 0.0011 | 220 | 1 |
| 2 | 100 | 0.004 | 0.0068 | 230 | 1 |
| 3 | 90 | 0.003 | 0.0040 | 100 | 1 |

TABLE 4

| Run | Catalyst System | Condition | Catalyst Charge (mg) | Yield (g) | Productivity (gPE/gcat/hr) | Uptake Ratio |
|---|---|---|---|---|---|---|
| 1 | Comparative Sample 1 | 1 | 20.3 | 38.59 | 1,901 | 0.352 |
| 2 | Comparative Sample 2 | 1 | 101.3 | 0.00 | 0 | 0.322 |
| 3 | Comparative Sample 3 | 1 | 10.7 | 69.60 | 6,504 | 0.234 |
| 4 | Sample 1 | 1 | 3.4 | 226.20 | 66,528 | 0.178 |
| 5 | Sample 2 | 1 | 3.2 | 108.00 | 33,749 | 0.272 |
| 6 | Comparative Sample 4 | 1 | 100.3 | 65.07 | 649 | 0.444 |
| 7 | Sample 3 | 1 | 6.3 | 37.80 | 6,000 | 0.382 |
| 8 | Sample 4 | 1[a] | 6.0 | 11.60 | 1,933 | 0.339 |
| 9 | Sample 5 | 1 | 6.8 | 16.19 | 2,381 | 0.344 |
| 10 | Sample 6 | 1 | 3.3 | 157.60 | 47,757 | 0.115 |
| 11 | Sample 7 | 1 | 10.5 | 131.20 | 12,495 | 0.163 |
| 12 | Comparative Sample 5 | 1 | 10.1 | 30.60 | 3,030 | 0.299 |
| 13 | Comparative Sample 6 | 1 | 10.6 | 35.40 | 3,339 | 0.275 |
| 14 | Sample 8 | 1 | 3.5 | 224.59 | 64,170 | 0.172 |
| 15 | Sample 9 | 1 | 3.2 | 98.20 | 30,687 | 0.243 |
| 16 | Sample 10 | 1 | 3.2 | 120.60 | 37,687 | 0.104 |
| 17 | Sample 11 | 1 | 3.1 | 124.60 | 40,192 | 0.189 |

TABLE 4-continued

| Run | Catalyst System | Condition | Catalyst Charge (mg) | Yield (g) | Productivity (gPE/gcat/hr) | Uptake Ratio |
|---|---|---|---|---|---|---|
| 18 | Comparative Sample 1 | 2 | 10.5 | 25.60 | 2,438 | 0.097 |
| 19 | Comparative Sample 2 | 2 | 100.3 | 1.40 | 14 | 0.063 |
| 20 | Comparative Sample 3 | 2 | 11.4 | 69.00 | 6,052 | 0.042 |
| 21 | Sample 1 | 2 | 3.2 | 250.39 | 130,414 | 0.044 |
| 22 | Sample 2 | 2 | 3.3 | 216.00 | 77,922 | 0.046 |
| 23 | Comparative Sample 4 | 2 | 101.4 | 36.79 | 363 | 0.116 |
| 24 | Sample 3 | 2 | 6.6 | 184.39 | 27,938 | 0.055 |
| 25 | Sample 4 | 2 | 6.1 | 105.59 | 17,310 | 0.078 |
| 26 | Sample 5 | 2 | 6.4 | 133.60 | 20,875 | 0.069 |
| 27 | Sample 6 | 2 | 3.0 | 125.39 | 41,798 | 0.024 |
| 28 | Sample 7 | 2 | 9.9 | 239.20 | 24,161 | — |
| 29 | Comparative Sample 5 | 2 | 10.0 | 18.80 | 1,880 | 0.049 |
| 30 | Comparative Sample 6 | 2 | 10.7 | 34.60 | 3,233 | 0.062 |
| 31 | Sample 8 | 2 | 3.4 | 127.80 | 37,588 | 0.049 |
| 32 | Sample 9 | 2 | 3.3 | 115.60 | 35,030 | 0.050 |
| 33 | Sample 10 | 2 | 3.3 | 265.40 | 182,781 | 0.018 |
| 34 | Sample 11 | 2 | 3.4 | 231.40 | 68,058 | 0.030 |
| 35 | Sample 12 | 2 | 0.9 | 255.39 | 283,771 | 0.002 |
| 36 | Sample 13 | 2 | 1.5 | 127.20 | 84,798 | 0.002 |
| 37 | Sample 14 | 2 | 1.7 | 141.40 | 83,173 | 0.003 |

[a]Temperature: 90° C., $H_2/C_2$ Ratio: 0.05, $C_2$ Partial Pressure: 220 psi

TABLE 5

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | C6 (wt. %; corrected) |
|---|---|---|---|---|---|---|
| 1 | 1 | 240,753 | 547,803 | 1,072,132 | 2.28 | 33.69 |
| 2 | 2 | — | — | — | — | — |
| 3 | 3 | 34,855 | 298,450 | 6,430,772 | 8.56 | 23.97 |
| 4 | 4 | 930,512 | 3,224,405 | 5,799,490 | 3.47 | 22.98 |
| 5 | 5 | 1,179,181 | 3,018,247 | 5,173,552 | 2.56 | 29.42 |
| 6 | 6 | — | — | — | — | — |
| 7 | 7 | 553,434 | 1,540,663 | 3,231,380 | 2.78 | 36.64 |
| 8 | 8 | 522,730 | 1,416,028 | 2,899,172 | 2.71 | 37.44 |
| 9 | 9 | 492,307 | 1,377,471 | 2,812,961 | 2.80 | 38.08 |
| 10 | 10 | 1,597,149 | 3,898,075 | 5,912,058 | 2.44 | 13.18 |
| 11 | 11 | 192,418 | 349,504 | 574,185 | 1.82 | 16.56 |
| 12 | 12 | 443,250 | 1,422,312 | 3,611,631 | 3.21 | 28.05 |
| 13 | 13 | 406,942 | 1,262,083 | 2,917,624 | 3.10 | 28.27 |
| 14 | 14 | 115,134 | 338,639 | 1,746,880 | 2.94 | 22.16 |
| 15 | 15 | 126,682 | 335,590 | 1,102,257 | 2.65 | 32.48 |
| 16 | 16 | 127,239 | 336,781 | 1,150,180 | 2.65 | 12.41 |
| 17 | 17 | 374,867 | 1,160,036 | 2,527,365 | 3.09 | 20.67 |
| 18 | 18 | 296,915 | 694,880 | 1,294,183 | 2.34 | 10.72 |
| 19 | 19 | — | — | — | — | — |
| 20 | 20 | 42,586 | 524,854 | 2,935,115 | 12.32 | 5.70 |
| 21 | 21 | 787,035 | 2,376,573 | 4,530,925 | 3.02 | 6.45 |
| 22 | 22 | 846,156 | 2,197,426 | 4,222,654 | 2.60 | 7.91 |
| 23 | 23 | — | — | — | — | — |
| 24 | 24 | 326,941 | 781,694 | 1,615,079 | 2.39 | 8.83 |
| 25 | 25 | 307,420 | 729,725 | 1,503,284 | 2.37 | 10.15 |
| 26 | 26 | 305,427 | 724,332 | 1,475,912 | 2.37 | 9.61 |
| 27 | 27 | 1,593,447 | 3,627,487 | 5,593,940 | 2.28 | 6.07 |
| 28 | 28 | 229,722 | 417,325 | 680,751 | 1.82 | 5.17 |
| 29 | 29 | 362,138 | 1,242,309 | 3,044,292 | 3.43 | 6.67 |
| 30 | 30 | 360,676 | 1,094,521 | 2,638,737 | 3.03 | 8.44 |
| 31 | 31 | 126,510 | 337,170 | 1,061,156 | 2.67 | 7.09 |
| 32 | 32 | 362,138 | 1,242,309 | 3,044,292 | 3.43 | 6.67 |
| 33 | 33 | 108,549 | 297,826 | 807,091 | 2.74 | 3.39 |
| 34 | 34 | 305,707 | 1,013,894 | 2,377,207 | 3.32 | 5.53 |
| 35 | 35 | — | — | — | — | — |

TABLE 5-continued

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | C6 (wt. %; corrected) |
|---|---|---|---|---|---|---|
| 36 | 36 | — | — | — | — | — |
| 37 | 37 | — | — | — | — | — |

As indicated by Table 4, catalyst systems including a metal-ligand complex having a germanium-containing bridge provide a higher productivity than catalyst systems including metal-ligand complexes having carbon bridges (i.e., bridges that contain only carbon connecting atoms). Put more simply, the catalyst systems of the present disclosure provide a greater productivity than comparative catalyst systems. This increase in productivity was unexpected because corresponding changes in the bridge structure generally do not improve productivity or efficiency in unsupported catalyst systems that include such metal-ligand complexes (which are typically used in solution-phase polymerization processes).

The effect of the bridge of the metal-ligand complex on the catalyst system is more clearly indicated when comparing runs conducted under similar conditions and using catalyst systems including metal-ligand complexes having similar "top groups" (i.e., $R^1$ and $R^{16}$ of formula (I)). For example, Runs 1-5 were each conducted under Condition 1 and used catalyst systems including metal-ligand complexes having 3,6-$tBu_2$-carbazolyl as both top groups. However, Run 4, which used Sample 1, produced more than 60,000 grams more of polymer per gram of catalyst system compared to Runs 1 and 3, which used Comparative Samples 1 and 3, and Run 2 did not produce polymer at all. An even greater increase in productivity can be seen when comparing Runs 18-22, which used the same catalyst systems as Runs 1-5, but were conducted under Condition 2. Similar increases in productivity provided by a metal-ligand complex having a germanium-containing bridge are indicated by comparing Runs 6-11 and 23-28, which used catalyst systems including metal-ligand complexes having $tBu_2$-phenyl as both top groups, Runs 12-15 and 29-32, which used catalyst systems including metal-ligand complexes having unsubstituted carbazolyl as both top groups.

Additional polyethylene samples were produced by contacting ethylene and 1-hexene with the catalyst systems reported in Table 2 in a gas-phase polymerization reactor in a manner consistent with that described previously. The reaction conditions and reactor data for each run are reported in Table 6. The properties of the poly(ethylene-co-1-hexene) copolymer produced by each run are reported in Table 7.

TABLE 6

| Run | Catalyst System | Temp (° C.) | $C_6/C_2$ Ratio | $H_2/C_2$ Ratio | $C_2$ Partial Pressure (psi) | Catalyst Charge (mg) | Yield (g) | Productivity (gPE/gcat/hr) | Efficiency (gPE/gM) |
|---|---|---|---|---|---|---|---|---|---|
| 38 | Sample 4 | 90 | 0.003 | 0.500 | 100 | 10.8 | 16.40 | 1,518 | 0.416 |
| 39 | Sample 4 | 90 | 0.003 | 0.100 | 100 | 10.4 | 58.40 | 5,615 | 1.539 |
| 40 | Sample 4 | 90 | 0.003 | 0.050 | 100 | 10.5 | 99.79 | 9,504 | 2.605 |
| 41 | Sample 4 | 90 | 0.003 | 0.010 | 100 | 10.8 | 163.79 | 15,166 | 4.156 |
| 42 | Sample 4 | 90 | 0.003 | 0.007 | 100 | 10.9 | 200.40 | 18,385 | 5.039 |
| 43 | Sample 4 | 90 | 0.003 | 0.004 | 100 | 10.9 | 143.40 | 18,529 | 3.606 |
| 44 | Sample 4 | 90 | 0.003 | 0.002 | 100 | 6.0 | 102.40 | 17,066 | 4.677 |
| 45 | Sample 4 | 90 | 0.003 | — | 100 | 10.4 | 218.39 | 13,207 | 5.755 |
| 46 | Comparative Sample 1 | 90 | 0.003 | 0.500 | 100 | 50.2 | 13.19 | 263 | 0.032 |
| 47 | Comparative Sample 1 | 90 | 0.003 | 0.100 | 100 | 49.9 | 18.39 | 369 | 0.045 |
| 48 | Comparative Sample 1 | 90 | 0.003 | 0.050 | 100 | 49.7 | 17.20 | 346 | 0.042 |
| 49 | Comparative Sample 1 | 90 | 0.003 | 0.010 | 100 | 51.2 | 72.60 | 1,418 | 0.173 |
| 50 | Comparative Sample 1 | 90 | 0.003 | 0.007 | 100 | 50.4 | 46.79 | 928 | 0.113 |
| 51 | Comparative Sample 1 | 90 | 0.003 | 0.004 | 100 | 50.6 | 54.40 | 1,075 | 0.131 |
| 52 | Comparative Sample 1 | 90 | 0.003 | 0.002 | 100 | 50.5 | 51.80 | 1,026 | 0.125 |
| 53 | Comparative Sample 1 | 90 | 0.003 | — | 100 | 20.4 | 36.20 | 1,774 | 0.217 |

TABLE 7

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | C6 (wt. %; corrected) | Tm (° C.) |
|---|---|---|---|---|---|---|---|
| 38 | 38 | 25,557 | 57,890 | 116,393 | 2.27 | 3.92 | 130.970 |
| 39 | 39 | 103,752 | 204,941 | 371,016 | 1.98 | 3.70 | 125.100 |
| 40 | 40 | 170,535 | 335,123 | 599,335 | 1.97 | 3.57 | 120.640 |
| 41 | 41 | 602,989 | 1,510,715 | 4,737,696 | 2.51 | 3.41 | 120.330 |
| 42 | 42 | 720,921 | 2,002,291 | 7,133,634 | 2.78 | 3.29 | 120.620 |

TABLE 7-continued

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | C6 (wt. %; corrected) | Tm (° C.) |
|---|---|---|---|---|---|---|---|
| 43 | 43 | 1,060,048 | 1,868,861 | 3,031,907 | 1.76 | 2.49 | 120.170 |
| 44 | 44 | 2,483,135 | 6,622,652 | 17,924,947 | 2.67 | 2.30 | 129.370 |
| 45 | 45 | — | — | — | — | — | — |
| 46 | 46 | 9,676 | 42,051 | 641,460 | 4.35 | 10.43 | 125.730 |
| 47 | 47 | 42,137 | 110,911 | 504,815 | 2.63 | 9.07 | 122.730 |
| 48 | 48 | 66,535 | 198,224 | 2,406,089 | 2.98 | 10.60 | 119.120 |
| 49 | 49 | 193,861 | 600,213 | 3,878,324 | 3.10 | 5.43 | 124.620 |
| 50 | 50 | 266,499 | 742,976 | 3,812,580 | 2.79 | 7.57 | 123.210 |
| 51 | 51 | — | — | — | — | — | 122.300 |
| 52 | 52 | — | — | — | — | — | 118.052 |
| 53 | 53 | — | — | — | — | — | — |

As indicated by Table 6, catalyst systems including a metal-ligand complex having a germanium-containing bridge provide a higher productivity than catalyst systems including metal-ligand complexes having carbon bridges under the same and/or similar conditions and relatively low ethylene partial pressure. For example, runs that used Sample 4 provided a greater productivity than runs that used Comparative Sample 1 when under the same reaction conditions. The increased productivity is important for use in dual reactor applications with relatively low ethylene partial pressures in the first reactor, which are utilized to increase the lifetime of catalysts systems to produce polymer in two reactors.

Additional polyethylene samples were produced by contacting ethylene with the catalyst systems reported in Table 2 in a gas-phase polymerization reactor in a manner consistent with that described previously, with the exception of the inclusion of 1-hexene. The reaction conditions and reactor data for each run are reported in Table 8. The properties of the poly(ethylene-co-1-hexene) copolymer produced by each run are reported in Table 9.

TABLE 8

| Run | Catalyst System | Temperature (° C.) | $H_2/C_2$ Ratio | $C_2$ Partial Pressure (psi) | Catalyst Charge (mg) | Yield (g) | Productivity (gPE/gcat/hr) | Efficiency (gPE/gM) |
|---|---|---|---|---|---|---|---|---|
| 54 | Sample 4 | 90 | 0.018 | 230 | 5.3 | 244.59 | 46,150 | 12.60 |
| 55 | Sample 4 | 90 | 0.010 | 230 | 5.2 | 254.39 | 48,922 | 13.40 |
| 56 | Sample 4 | 90 | 0.007 | 230 | 5.0 | 223.59 | 44,718 | 12.30 |
| 57 | Sample 4 | 90 | 0.004 | 230 | 5.1 | 251.20 | 49,254 | 13.50 |
| 58 | Sample 4 | 90 | 0.010 | 165 | 5.8 | 174.00 | 29,999 | 8.20 |
| 59 | Sample 4 | 90 | 0.010 | 100 | 5.1 | 78.91 | 15,472 | 4.20 |
| 60 | Sample 4 | 105 | 0.010 | 230 | 4.8 | 101.19 | 21,081 | 5.80 |
| 61 | Sample 4 | 80 | 0.010 | 230 | 5.0 | 245.78 | 49,157 | 13.50 |
| 62 | Sample 4 | 80 | 0.010 | 230 | 1.9 | 111.57 | 58,723 | 16.10 |
| 63 | Comparative Sample 1 | 100 | 0.050 | 230 | 20.3 | 146.60 | 7,222 | 0.88 |
| 64 | Comparative Sample 1 | 100 | 0.100 | 230 | 10.2 | 131.80 | 12,922 | 1.58 |
| 65 | Comparative Sample 1 | 100 | 0.500 | 230 | 9.9 | 90.00 | 9,091 | 1.11 |
| 66 | Comparative Sample 1 | 100 | 1.000 | 230 | 10.4 | 66.39 | 6,383 | 0.78 |
| 67 | Comparative Sample 1 | 100 | 0.050 | 230 | 9.7 | 48.40 | 4,990 | 0.61 |
| 68 | Comparative Sample 1 | 100 | 0.100 | 230 | 10.2 | 39.17 | 3,840 | 0.47 |
| 69 | Comparative Sample 1 | 100 | 0.500 | 230 | 10.0 | 21.20 | 2,119 | 0.26 |
| 70 | Comparative Sample 1 | 100 | 1.000 | 230 | 10.1 | 16.92 | 1,675 | 0.20 |

TABLE 9

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | Molecular Weight Distribution (Mz/Mw) | Tm (° C.) |
|---|---|---|---|---|---|---|---|
| 54 | 54 | 294,577 | 721,512 | 1,917,434 | 2.45 | 2.66 | 143.30 |
| 55 | 55 | 475,106 | 1,193,394 | 2,943,059 | 2.51 | 2.47 | — |

TABLE 9-continued

| Polymer | Run | Number Average Molecular Weight (Mn) (g/mol) | Weight Average Molecular Weight (Mw) (g/mol) | Z-Average Molecular Weight (Mz) (g/mol) | Molecular Weight Distribution (Mw/Mn) | Molecular Weight Distribution (Mz/Mw) | Tm (° C.) |
|---|---|---|---|---|---|---|---|
| 56 | 56 | 655,118 | 1,509,293 | 3,682,816 | 2.30 | 2.44 | — |
| 57 | 57 | 1,070,457 | 2,438,370 | 5,462,562 | 2.28 | 2.24 | — |
| 58 | 58 | 487,073 | 1,222,617 | 3,061,832 | 2.51 | 2.50 | — |
| 59 | 59 | 485,973 | 1,360,793 | 3,472,563 | 2.80 | 2.55 | — |
| 60 | 60 | 478,576 | 1,208,172 | 2,850,833 | 2.52 | 2.36 | — |
| 61 | 61 | 402,555 | 1,136,576 | 3,153,277 | 2.82 | 2.77 | — |
| 62 | 62 | 680,336 | 1,432,085 | 3,071,158 | 2.10 | 2.14 | — |
| 63 | 63 | 483,431 | 1,742,038 | 3,831,521 | 3.60 | 2.20 | 134.21 |
| 64 | 64 | 593,252 | 1,635,019 | 3,600,097 | 2.76 | 2.20 | 133.86 |
| 65 | 65 | 276,569 | 835,806 | 2,399,047 | 3.02 | 2.87 | 136.65 |
| 66 | 66 | 196,004 | 655,099 | 2,646,403 | 3.34 | 4.04 | 137.17 |
| 67 | 67 | 61,726 | 262,804 | 2,341,962 | 4.26 | 8.91 | 138.03 |
| 68 | 68 | 32,427 | 175,067 | 1,811,919 | 5.40 | 10.35 | 139.69 |
| 69 | 69 | 7,765 | 49,055 | 401,747 | 6.32 | 8.19 | 134.68 |
| 70 | 70 | 4,074 | 24,395 | 234,260 | 5.99 | 9.60 | — |

Additional polyethylene samples were produced by contacting ethylene and 1-hexene with the catalyst systems reported in Table 2 in a gas-phase polymerization reactor in a manner consistent with that described previously. The reaction conditions and reactor data for each run are reported in Table 10.

TABLE 10

| Run | Catalyst System | Temperature (° C.) | $C_6$/ $C_2$ Ratio | $H_2$/ $C_2$ Ratio | $C_2$ Partial Pressure (psi) | Catalyst Charge (mg) | Yield (g) | Productivity (gPE/gcat/hr) | Efficiency (gPE/g M) | Melt Index ($I_{21}$) (dg/min) |
|---|---|---|---|---|---|---|---|---|---|---|
| 71 | Sample 4 | 90 | 0.004 | 0.0500 | 200 | 9.9 | 239.20 | 24,161 | 6.62 | 0.21 |
| 72 | Sample 4 | 93 | 0.016 | 0.0500 | 200 | 10.5 | 131.20 | 12,495 | 3.42 | 0.32 |
| 73 | Comparative Sample 4 | 90 | 0.016 | 0.0011 | 220 | 101.4 | 36.79 | 363 | 0.08 | 0.02 |
| 74 | Comparative Sample 4 | 100 | 0.004 | 0.0068 | 230 | 100.3 | 65.07 | 649 | 0.15 | 0.85 |

In Table 10, Runs 71-74 were each conducted under similar conditions; however, Runs 71 and 72 used Sample 4, and Runs 73 and 74 used Comparative Sample 4. The primary difference between the metal-ligand complexes of Sample 4 and Comparative Sample 4 are the bridges. Specifically, the metal-ligand complex of Comparative Sample 4 has a $—CH_3CH_3CH_3—$ bridge and the metal-ligand complex of Sample 4 has a $—CH_2Ge(iPr)_2CH_2—$ bridge. However, as a result of this difference, Runs 71 and 72 had productivities at least nineteen times greater than the productivities of Runs 73 and 74, and efficiencies at least twenty-two times greater than the efficiencies of Runs 73 and 74. That is, given similar conditions, catalyst systems that include a metal-ligand complex having a germanium-containing bridge may result in polymerization processes that are significantly more productive and efficient than those that utilize catalyst systems that include a similar metal-ligand complex having a carbon bridge.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 $g/cm^3$” is intended to mean “about 40 $g/cm^3$.”

Notations used in the equations included herein refer to their standard meaning as understood in the field of mathematics. For example, “=” means equal to, “×” denotes the multiplication operation, “+” denotes the addition operation, “−” denotes the subtraction operation, “>” is a “greater than” sign, “<” is a “less than” sign, “and “/” denotes the division operation.

Every document cited herein, if any, including any cross-referenced or related patent or patent application and any patent or patent application to which this application claims priority or benefit thereof, is incorporated by reference in its entirety unless expressly excluded or otherwise limited. The citation of any document is not an admission that it is prior art with respect to any embodiment disclosed or claimed, or that it alone, or in any combination with any other reference or references, teaches, suggests, or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A procatalyst comprising a metal-ligand complex disposed on one or more support materials, wherein the metal-ligand complex has a structure according to formula (I):

(I)

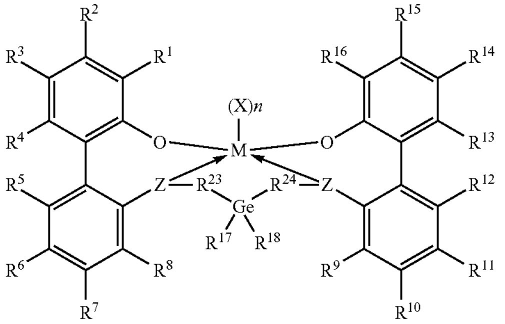

wherein:

M is titanium, zirconium, or hafnium;

N is 1, 2, or 3;

each X is a monodentate ligand independently chosen from unsaturated ($C_2$-$C_{50}$)hydrocarbon, unsaturated ($C_2$-$C_{50}$)heterohydrocarbon, ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, halogen, —$N(R^N)_2$, and —$N(R^N)COR^C$;

the metal-ligand complex is overall charge-neutral;

each Z is independently chosen from —O—, —S—, ($C_6$-$C_{50}$)aryl, ($C_4$-$C_{50}$)heteroaryl, N($C_1$-$C_{50}$)hydrocarbyl, and P($C_1$-$C_{50}$)hydrocarbyl;

$R^1$ and $R^{16}$ are independently chosen from ($C_6$-$C_{50}$)aryl, ($C_4$-$C_{50}$)heteroaryl, ($C_1$-$C_{50}$)alkyl, ($C_3$-$C_{40}$)heteroalkyl, radicals having formula (II), radicals having formula (III), and radicals having formula (IV):

(II)

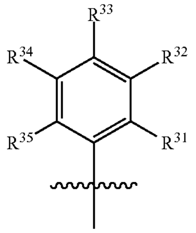

(III)

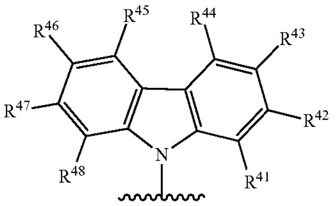

(IV)

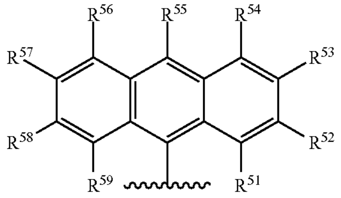

wherein $R^{31-35}$, $R^{41-48}$, and $R^{51-59}$ are independently chosen from —H, ($C_1$-$C_{50}$)hydrocarbyl, ($C_1$-$C_{50}$) heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^C)_2NC(O)$—, and halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, ($C_1$-$C_{50}$)hydrocarbyl, ($C_1$-$C_{50}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R)$—, $(R^C)_2NC(O)$—, and halogen;

$R^{23}$ and $R^{24}$ are independently chosen from —$(CR^C_2)_m$—, wherein subscript m is from 1 to 10;

$R^{17}$ and $R^{18}$ are independently chosen from linear or branched ($C_1$-$C_{20}$)alkyl; and each $R^C$, $R^P$, and $R^N$ are independently chosen from —H, ($C_1$-$C_{50}$)hydrocarbyl, and ($C_1$-$C_{50}$)heterohydrocarbyl.

2. The procatalyst of claim 1, wherein $R^1$ and $R^{16}$ are the same.

3. The procatalyst of claim 1, wherein at least one of $R^1$ and $R^{16}$ is a radical having formula (II) and at least one of $R^{32}$ and $R^{34}$ is tert-butyl.

4. The procatalyst of claim 1, wherein at least one of $R^1$ and $R^{16}$ is a radical having formula (III).

5. The procatalyst of claim 4, wherein at least one of $R^{42}$, $R^{43}$, $R^{46}$, and $R^{47}$ is tert-butyl.

6. The procatalyst of claim 4, wherein $R^{41-48}$ are —H.

7. The procatalyst of claim 1, wherein the one or more support materials comprise fumed silica.

8. A catalyst system comprising the procatalyst of claim 1 and one or more activators.

9. The catalyst system of claim 8, wherein the activator comprises methylalumoxane (MAO).

10. A method for producing a catalyst system, the method comprising:

contacting one or more support materials, one or more activators, and a metal-ligand complex in an inert hydrocarbon solvent to produce the catalyst system, wherein the metal-ligand complex has a structure according to formula (Ia):

(Ia)

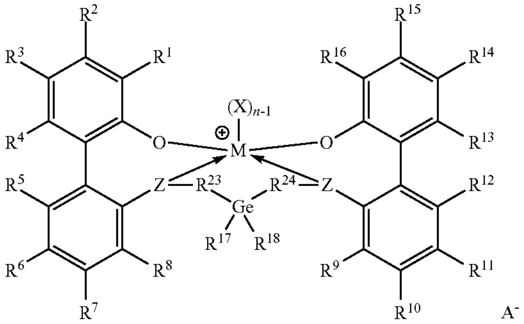

wherein:

$A^-$ is an anion;

M is titanium, zirconium, or hafnium; n is 1, 2, or 3;

each X is a monodentate ligand independently chosen from unsaturated ($C_2$-$C_{50}$)hydrocarbon, unsaturated ($C_2$-$C_{50}$)heterohydrocarbon, ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, halogen, —$N(R^N)_2$, and —$N(R^N)COR^C$;

each Z is independently chosen from —O—, —S—, ($C_6$-$C_{50}$)aryl, ($C_4$-$C_{50}$)heteroaryl, N($C_1$-$C_{40}$)hydrocarbyl, and P($C_1$-$C_{40}$)hydrocarbyl;

$R^1$ and $R^{16}$ are independently chosen from $(C_6\text{-}C_{50})$aryl, $(C_4\text{-}C_{50})$heteroaryl, $(C_1\text{-}C_{40})$alkyl, $(C_3\text{-}C_{40})$heteroalkyl, radicals having formula (II), radicals having formula (III), and radicals having formula (IV):

(II)

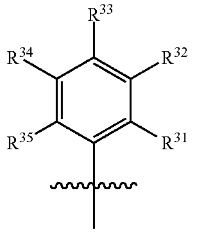

(III)

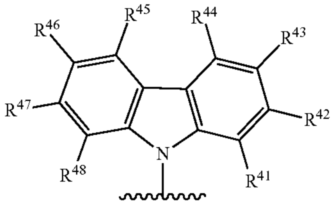

(IV)

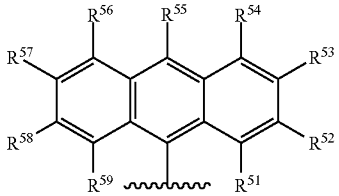

wherein $R^{31\text{-}35}$, $R^{41\text{-}48}$, and $R^{51\text{-}59}$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^C)_2NC(O)—$, and halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R)—$, $(R^C)_2NC(O)—$, and halogen;

$R^{23}$ and $R^{24}$ are independently chosen from $—(CR^C{}_2)_m—$, wherein subscript m is from 1 to 10;

$R^{17}$ and $R^{18}$ are independently chosen from linear or branched $(C_1\text{-}C_{20})$alkyl; and each $R^C$, $R^P$, and $R^N$ are independently chosen from —H, $(C_1\text{-}C_{50})$hydrocarbyl, and $(C_1\text{-}C_{50})$heterohydrocarbyl.

11. The method of claim 10, wherein the activator comprises methylalumoxane (MAO).

12. The method of claim 10, wherein the method further comprises:

mixing the one or more support materials, the one or more activators, and the metal-ligand complex in the inert hydrocarbon solvent to produce a catalyst system precursor; and drying the catalyst system precursor to produce the catalyst system.

13. The method of claim 12, wherein the catalyst system precursor is spray dried to produce the catalyst system; and the catalyst system comprises spray-dried particles.

14. The method of claim 10, wherein the method further comprises:

disposing the one or more activators on the one or more support materials to produce a supported activator; and contacting the supported activator with a solution of the metal-ligand complex in the inert hydrocarbon solvent.

15. The method of claim 14, wherein disposing the one or more activators on the one or more support materials comprises spray drying to produce a spray-dried supported activator.

16. A process for producing polyethylene, the process comprising contacting ethylene and, optionally, one or more $(C_3\text{-}C_{12})\alpha$-olefin comonomers with a catalyst system in a gas-phase polymerization reactor, wherein the catalyst system comprises a metal-ligand complex disposed on one or more support materials; and the metal-ligand complex has a structure according to formula (Ia):

(Ia)

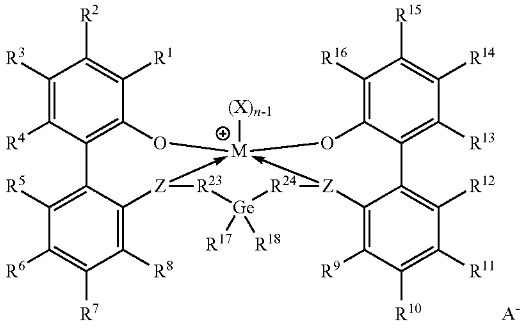

wherein:

$A^-$ is an anion;

M is titanium, zirconium, or hafnium; subscript n of $(X)_n$ is 1, 2, or 3;

each X is a monodentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, halogen, $—N(R^N)_2$, and $—N(R^N)COR^C$;

each Z is independently chosen from —O—, —S—, $(C_6\text{-}C_{50})$aryl, $(C_4\text{-}C_{50})$heteroaryl, $N(C_1\text{-}C_{40})$hydrocarbyl, and $P(C_1\text{-}C_{40})$hydrocarbyl;

$R^1$ and $R^{16}$ are independently chosen from $(C_6\text{-}C_{50})$aryl, $(C_4\text{-}C_{50})$heteroaryl, $(C_1\text{-}C_{40})$alkyl, $(C_3\text{-}C_{40})$heteroalkyl, radicals having formula (II), radicals having formula (III), and radicals having formula (IV):

(II)

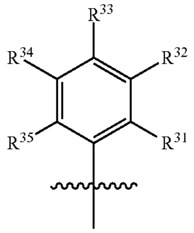

-continued (III)

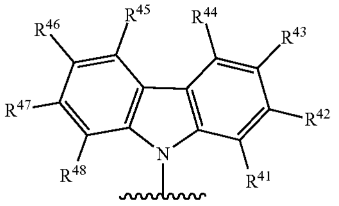

(IV)

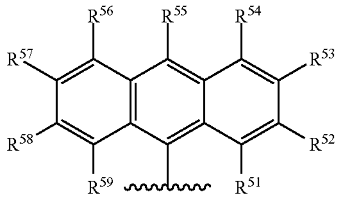

wherein $R^{31-35}$, $R^{41-48}$, and $R^{51-59}$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$=N—, $R^CC(O)O$—, $R^COC(O)$—, $R^CC(O)N(R^N)$—, $(R^C)_2NC(O)$—, and halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$=N—, $R^CC(O)O$—, $R^COC(O)$—, $R^CC(O)N(R)$—, $(R^C)_2NC(O)$—, and halogen;

$R^{23}$ and $R^{24}$ are independently chosen from —$(CR^C_2)_m$—, wherein subscript m is from 1 to 10;

$R^{17}$ and $R^{18}$ are independently chosen from linear or branched $(C_1\text{-}C_{20})$alkyl; and each $R^C$, $R^P$, and $R^N$ are independently chosen from —H, $(C_1\text{-}C_{50})$hydrocarbyl, and $(C_1\text{-}C_{50})$heterohydrocarbyl.

17. The process of claim 16, wherein the catalyst system further comprises an activator.

18. The process of claim 17, wherein the activator comprises methylalumoxane (MAO).

19. The process of claim 16, wherein the catalyst system is fed to the gas-phase polymerization reactor in neat form, as a solution, or as a slurry.

20. The process of claim 16, wherein the catalyst system comprises spray-dried particles.

* * * * *